United States Patent
Igarashi

(10) Patent No.: US 9,191,693 B2
(45) Date of Patent: Nov. 17, 2015

(54) INFORMATION PROCESSING DEVICE, INFORMATION PROCESSING SYSTEM, AND PROGRAM

(75) Inventor: Tatsuya Igarashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 49 days.

(21) Appl. No.: 13/581,127

(22) PCT Filed: Apr. 25, 2011

(86) PCT No.: PCT/JP2011/002407
§ 371 (c)(1),
(2), (4) Date: Aug. 24, 2012

(87) PCT Pub. No.: WO2011/142093
PCT Pub. Date: Nov. 17, 2011

(65) Prior Publication Data
US 2012/0320248 A1 Dec. 20, 2012

(30) Foreign Application Priority Data

May 14, 2010 (JP) ................................. 2010-111944

(51) Int. Cl.
*H04N 21/433* (2011.01)
*G06F 17/30* (2006.01)
(Continued)

(52) U.S. Cl.
CPC ............ *H04N 21/4334* (2013.01); *G01C 21/32* (2013.01); *G06F 17/30041* (2013.01); *G06F 17/30265* (2013.01); *G06F 17/30268* (2013.01); *G06F 17/30817* (2013.01); *G06T 19/00* (2013.01); *H04N 5/23206* (2013.01);

(Continued)

(58) Field of Classification Search
CPC ....... H04N 7/173; H04N 5/222; H04N 5/225; H04N 5/76; H04N 5/228; H04N 21/4334; H04N 9/8233; H04N 21/4223; H04N 21/42202; H04N 21/8153; H04N 5/23293; H04N 5/23206; G06F 17/30817; G06F 17/30265; G01C 21/32; G06T 19/00
USPC ............ 348/333.01–333.12, 39, 207.99, 369, 348/231.99, 231.2, 231.8, 222.1, 633; 725/105
See application file for complete search history.

(56) References Cited

U.S. PATENT DOCUMENTS

| 6,750,903 B1 * | 6/2004 | Miyatake et al. .......... 348/218.1 |
| 2006/0001757 A1 | 1/2006 | Sawachi |

(Continued)

FOREIGN PATENT DOCUMENTS

| JP | 2001-169164 A | 6/2001 |
| JP | 3225882 B2 | 11/2001 |

(Continued)

OTHER PUBLICATIONS

International Search Report and Written Opinion issued Jun. 7, 2011, in PCT/JP2011/002407 filed Apr. 25, 2011.

(Continued)

*Primary Examiner* — Tuan Ho
*Assistant Examiner* — Marly Camargo
(74) *Attorney, Agent, or Firm* — Hazuki International, LLC

(57) ABSTRACT

An information processing apparatus that acquires first information corresponding to a position of an imaging device that captures image data, and second information corresponding to a field of view of the imaging device that captures the image data, and generates tag information based on the first and second information.

12 Claims, 23 Drawing Sheets

(51) Int. Cl.
  *H04N 9/82* (2006.01)
  *H04N 21/4223* (2011.01)
  *H04N 21/422* (2011.01)
  *H04N 5/232* (2006.01)
  *G01C 21/32* (2006.01)
  *H04N 21/81* (2011.01)
  *G06T 19/00* (2011.01)
  *G06T 17/30* (2006.01)

(52) U.S. Cl.
  CPC ......... *H04N5/23293* (2013.01); *H04N 9/8233* (2013.01); *H04N 21/4223* (2013.01); *H04N 21/42202* (2013.01); *H04N 21/8153* (2013.01); *G06T 2219/004* (2013.01)

(56) References Cited

U.S. PATENT DOCUMENTS

2007/0162942 A1* 7/2007 Hamynen et al. ............. 725/105
2008/0069404 A1* 3/2008 Lee et al. ...................... 382/106
2013/0012237 A1 1/2013 Hamynen et al.

FOREIGN PATENT DOCUMENTS

JP 2004-333261 A 11/2004
JP 2009-135597 A 6/2009

OTHER PUBLICATIONS

Japanese Office Action issued Oct. 22, 2013, in Japan Patent Application No. 2010-111944.

The Extended European Search Report issued Oct. 9, 2013, in Application No. / Patent No. 11780353.6—1952 / 2569933 PCT/JP2011002407.

Office Action issued Jan. 7, 2014, in Japanese Patent Application No. 2010-111944.

* cited by examiner

Fig. 2

| mdp_id | NAME | mdp_id | NAME |
|---|---|---|---|
| 0x13 | Time Code | 0xB0 | GPS Version ID |
| 0x14 | Binary Group | 0xB1 | GPS Latitude Ref |
| 0x18 | REC Time&Date1 | 0xB2 | GPS Latitude1 |
| 0x19 | REC Time&Date2 | 0xB3 | GPS Latitude2 |
| 0x70 | Consumer Camera1 | 0xB4 | GPS Latitude3 |
| 0x71 | Consumer Camera2 | 0xB5 | GPS Longitude Ref |
| 0x73 | Lens | 0xB6 | GPS Longitude1 |
| 0x74 | Gain | 0xB7 | GPS Longitude2 |
| 0x75 | Pedestal | 0xB8 | GPS Longitude3 |
| 0x76 | Gamma | 0xB9 | GPS Altitude Ref |
| 0x77 | Detail | 0xBA | GPS Altitude |
| 0x7B | Camera Preset | 0xBB | GPS Timestamp1 |
| 0x7C | Flare | 0xBC | GPS Timestamp2 |
| 0x7D | Shading | 0xBD | GPS Timestamp3 |
| 0x7E | Knee | 0xBE | GPS Status |
| 0x7F | Shotter | 0xBF | GPS Measure Mode |
| 0xA0 | Exposure Time | 0xC0 | GPS DOP |
| 0xA1 | F Number | 0xC1 | GPS Speed Ref |
| 0xA2 | Exposure Program | 0xC2 | GPS Speed |
| 0xA3 | Brightness Value | 0xC3 | GPS Track Ref |
| 0xA4 | Exposure Bias Value | 0xC4 | GPS Track |
| 0xA5 | Max Aperture Value | 0xC5 | GPS Img Direction R |
| 0xA6 | Flash | 0xC6 | GPS Img Direction |
| 0xA7 | Custon Rendered | 0xC7 | GPS Map Datum1 |
| 0xA8 | White Balance | 0xC8 | GPS Map Datum2 |
| 0xA9 | Focal Length in 35mm Film | 0xC9 \| 0xCF | GPS Option |
| 0xAA | Scene Capture Type | | |
| 0xAB \| 0xAF | Exif Option | 0xE0 | Maker & Model ID |
| | | 0xE1 \| 0xEF | Maker Option |
| | | OTHERS | (Resarved) |

Fig. 3

| PHOTOGRAPHING POSITION | LATITUDE N2  LONGITUDE E2  ALTITUDE A2  AZIMUTH D2 | LATITUDE N3  LONGITUDE E3  ALTITUDE A3  AZIMUTH D1 | LATITUDE N1  LONGITUDE E1  ALTITUDE A1  AZIMUTH D1 |
|---|---|---|---|
| PHOTOGRAPHING CONDITION | ANGLE-OF-IMAGE-FIELD T1  DEPTH OF FIELD ∞ | ANGLE-OF-IMAGE-FIELD T1  DEPTH OF FIELD ∞ | ANGLE-OF-IMAGE-FIELD T2  DEPTH OF FIELD 5-10m |

Fig. 6

| POINT-OF-VIEW INFORMATION ||||| FIELD-OF-VIEW INFORMATION |||| INFORMATION TAG ||||
|---|---|---|---|---|---|---|---|---|---|---|---|---|
| LATITUDE (DEGREES) | LONGITUDE (DEGREES) | ALTITUDE (METERS) | ERROR (METERS) | AZIMUTH (DEGREES) | ANGLE OF VIEW FIELD (DEGREES) | HEIGHT (PIXELS) | WIDTH (PIXELS) | DISTANCE (METERS) | X (Pixel) | Y (Pixel) | TAG NAME (CHARACTER STRINGS) |
| 122.370533 | 37.823842 | 447.0 | 5 | 130.2 | 65 | 1920 | 1080 | 103 | 248 | -104 | Mt. TwinPeak |
|  |  |  |  |  |  |  |  | 76 | 877 | -104 | Mt. hillclaim |
| 122.370323 | 37.823323 | 447.0 | 10 | 131.1 | 30 | 1920 | 1080 | 5 | 03 | 81 | Y's Lounge |
|  |  |  |  |  |  |  |  | 5 | 123 | 745 | Information |
| 122.374376 | 37.824743 | 410.0 | 5 | 128.4 | 30 | 1440 | 1080 | 100 | 43 | -10 | Trek Point 1 |
| 122.374376 | 37.824743 | 410.0 | 5 | 128.4 | 30 | 1440 | 1080 | 324 | 134 | 434 | Trek Point 2 |
|  |  |  |  |  |  |  |  |  |  |  |  |

Fig. 8

| Key | Value |
|---|---|
| ABC | VALUE 1 |
| AGF | VALUE 2 |
| AGF8G | VALUE 3 |
| AGF9G | VALUE 4 |
| AGE | VALUE 5 |
| AF | VALUE 6 |
| AF72H | VALUE 7 |
| | |

Fig. 10

| POINT-OF-VIEW INFORMATION (43 TO 49 BITS) | | |
|---|---|---|
| POSITION PRECISION (0 OR 2 BITS) | FIELD-OF-VIEW INFORMATION (0 OR 4 TO 6 BITS) | SUBJECT DISTANCE (0 OR 8 BITS) |

POINT-OF-VIEW INFORMATION: $E\text{-}b_n$ | $N\text{-}b_{n-1}$ | $E\text{-}b_{n-1}$ | ... | $N\text{-}b_0$ | $E\text{-}b_0$ POSITION ERROR: $D\text{-}b_1$ | $D\text{-}b_0$ FIELD-OF-VIEW INFORMATION: $V\text{-}b_m$ | $V\text{-}b_{m-1}$ | ... | $V\text{-}b_0$ SUBJECT DISTANCE: $D\text{-}b_7$ | $D\text{-}b_6$ | ... | $E\text{-}b_0$

| NUMBER OF BITS | AZIMUTH DIVISION (DEGREES) | ANGLE OF IMAGE FIELD (DEGREES) | REFERENCE (35-MM CONVERSION) | |
|---|---|---|---|---|
| | | | FIELD-OF-VIEW CLASSIFICATION | FOCAL LENGTH |
| 4 | 22.5 | > 74 | ULTRA WIDE ANGLE | < 28 |
| | | >= 46 | WIDE ANGLE | 28-50 |
| 5 | 11.25 | >= 18 | ZOOM | 50-105 |
| 6 | 6.125 | < 18 | ULTRA ZOOM | > 105 |

Fig. 14

| POINT-OF-VIEW INFORMATION | | NUMBER OF BITS OF FIELD-OF-VIEW INFORMATION (ANGLE OF VIEW FIELD) | | | DISTANCE | | | | POINT-OF-VIEW POSITION ERROR OF COMPARATIVE OBJECT |
|---|---|---|---|---|---|---|---|---|---|
| NUMBER OF BITS | PARTITION LENGTH (NORTH-SOUTH) | 3 (WIDE ANGLE) | 4 (ZOOM) | 5 (ULTRA ZOOM) | MORE THAN 100 M | 100 M TO MORE THAN 10 M | 10 M TO LESS THAN 5 M | 5 M OR LESS | |
| 43 | 約9.53m | ○ | | | ○ | | | | 9.53M OR LESS |
| 45 | 約4.76m | ○ | | | | ○ | | | 4.76M OR LESS |
| 47 | 約2.38m | ○ | ○ | | ○ | | ○ | | 2.39M OR LESS |
| 49 | 約1.19m | ○ | ○ | ○ | ○ | ○ | ○ | ○ | 1.19M OR LESS |

Fig. 15

| BIT SEQUENCE | CODE CHARACTER | BIT SEQUENCE | CODE CHARACTER | BIT SEQUENCE | CODE CHARACTER | BIT SEQUENCE | CODE CHARACTER |
|---|---|---|---|---|---|---|---|
| NO (ROW-CELL) | – (hyphen) | | | | | | |
| 0 | 0 | 0000 | E | 00000 | U | 10000 | k |
| 1 | 1 | 0001 | F | 00001 | V | 10001 | l |
| 00 | 2 | 0010 | G | 00010 | W | 10010 | m |
| 01 | 3 | 0011 | H | 00011 | X | 10011 | n |
| 10 | 4 | 0100 | I | 00100 | Y | 10100 | o |
| 11 | 5 | 0101 | J | 00101 | Z | 10101 | p |
| 000 | 6 | 0110 | K | 00110 | a | 10110 | q |
| 001 | 7 | 0111 | L | 00111 | b | 10111 | r |
| 010 | 8 | 1000 | M | 01000 | c | 11000 | s |
| 011 | 9 | 1000 | N | 01001 | d | 11001 | t |
| 100 | A | 1001 | O | 01010 | e | 11010 | u |
| 101 | B | 1010 | P | 01100 | f | 11100 | v |
| 110 | C | 1100 | Q | 01101 | g | 11101 | w |
| 111 | D | 1101 | R | 01110 | h | 11110 | x |
| | | 1110 | S | 01110 | i | 11110 | y |
| | | 1111 | T | 01111 | j | 11111 | z |

Fig. 17

```
public class ImageSource {
    String url;
    ViewPosition imagePosition;
    ViewDirection imageDirection;
    public class scene {
        int frame;
        double angleHorizontal;
        int width;
        int height;
    };
};

public class ViewPosition {
    double latitude;
    double longitude;
    double altitude;
    double range;
};

Public class ViewDirection {
    double directionHorizaontal;
    double directionVertical;
    int distance;
};
```

```
public class Tag {
    public class Key {
        String key;
        public void key(
            String viewHash,
            Unsigned char type,
            Date timeStamp) {
            key = viewHash
                + type
                + timeStamp;
        }
    };
    public class Value {
        String name;
        int type;
        Date timeStamp;
        ViewPosition tagPosition;
        ViewDirection tagDirection;
        class tagSource {
            ImageSource ImageSource;
            int tagX;
            int tagY;
        };
    };
};
```

INFORMATION PROCESSING DEVICE, INFORMATION PROCESSING SYSTEM, AND PROGRAM

TECHNICAL FIELD

The present disclosure relates to an information processing device, an information processing system, and a program.

BACKGROUND ART

Technology of augmenting real-world activities by superimposing information regarding a shooting position on a video captured by a camera using text or the like has been rapidly studied and progressed as augmented reality (AR) since the early 1990s, and AR using a head mount display has already partially started for practical use in military purposes.

Recently, AR has been realized by a terminal device having functions of a camera and a global positioning system (GPS) accompanying high performance of small-size electronic devices. In this example of AR, a user is capable of adding text to a real video and providing other users with added text information via a network using the AR technology. As described above, AR is used as a type of communication tool as well as in practical purposes of information provision. As technology regarding AR, for example, there is a landscape labeling system of Patent Literature 1.

The landscape labeling system of Patent Literature 1 superimposes a tag associated with a position of a structure shown on earth-based three-dimensional spatial coordinates in a video. Thus, it is significantly suitable when information shown on the tag is a name of a structure associated with the tag, or the like.

CITATION LIST

Patent Literature

PTL 1: Japanese Patent No. 3225882

SUMMARY OF INVENTION

Technical Problem

However, there is meaningful information only in a video viewed from a position where the video is captured, and an azimuth in which the video is captured, by predetermined shooting conditions in information that a user desires to share as a tag. A method of sharing the above-described information is not considered in the related art and is potentially necessary.

In light of the foregoing, it is desirable to provide a novel and improved information processing device, information processing system, and program that can use a tag associated with coordinates on a field-of-view space of a captured video.

Solution to Problem

One embodiment of the present disclosure is directed to an information processing apparatus includes an acquisition unit configured to acquire first information corresponding to a position of an imaging device that captures image data, and second information corresponding to a field of view of the imaging device that captures the image data; and a processor configured to generate tag information based on the first and second information.

The tag information may include point-of-view information including one or more of information corresponding to a latitude and longitude of the imaging device, information corresponding to an altitude of the imaging device and error information indicating a precision of position information corresponding to the imaging device included in the tag information.

The tag information may include field-of-view information including one or more of information corresponding to an azimuth of the imaging device, information corresponding to a field of view angle of the imaging device, and information corresponding to a height and width of the captured image data.

The tag information may include an information tag including one or more of information corresponding to a distance between the imaging device and a subject of the captured image, information identifying a position that the tag is to be displayed on displayed image data, and a character string to be displayed on displayed image data.

Another embodiment of the present disclosure is directed to an information processing method comprising: acquiring first information corresponding to a position of an imaging device that captures image data; acquiring second information corresponding to a field of view of the imaging device that captures the image data; and generating, by a processor, tag information based on the first and second information.

Another embodiment of the present disclosure is directed to a non-transitory computer-readable medium including computer program instructions, which when executed by an information processing apparatus, cause the information processing apparatus to perform a method comprising: acquiring first information corresponding to a position of an imaging device that captures image data; acquiring second information corresponding to a field of view of the imaging device that captures the image data; and generating tag information based on the first and second information.

Another embodiment of the present disclosure is directed to an information processing device comprising: an acquisition unit configured to acquire shooting information corresponding to reproduced image data; and a processor configured to acquire tag information based on a comparison of the shooting information to stored tag information, and superimpose tag information on the reproduced image data based on a result of the comparison.

The shooting information may include location information corresponding to a location of an imaging device that captured the reproduced image data, and the processor may be configured to acquire the tag information based on a comparison of the location information to location information included in the stored tag information.

The shooting information may include field-of-view information corresponding to a field of view of the imaging device that captured the reproduced image data, and the processor may be configured to acquire the tag information based on a comparison of the field-of-view information to field-of-view information included in the stored tag information.

The shooting information may include range information corresponding to a distance between an imaging device that captured the reproduced image data and a subject of the reproduced image data.

The processor may be configured to acquire the tag information based on a comparison of the range information to range information included in the stored tag information.

Another embodiment of the present disclosure is directed to an information processing method comprising: acquiring shooting information corresponding to reproduced image data; acquiring tag information based on a comparison of the shooting information to tag information stored in memory; and superimposing tag information on the reproduced image data based on a result of the comparison.

Another embodiment of the present disclosure is directed to a non-transitory computer-readable medium including computer program instructions, which when executed by an information processing apparatus, cause the information processing apparatus to perform a method comprising: acquiring shooting information corresponding to reproduced image data; acquiring tag information based on a comparison of the shooting information to tag information stored in memory; and superimposing tag information on the reproduced image data based on a result of the comparison.

Advantageous Effects of Invention

According to the present disclosure as described above, it is possible to provide a novel and improved information processing device, information processing system, and program that can use a tag associated with coordinates on a field-of-view space of a captured video.

BRIEF DESCRIPTION OF DRAWINGS

FIG. 2 is a table showing an example of shooting information;

FIG. 3 is an illustrative diagram showing an example of advantageous effects of the information processing system;

FIG. 6 is a table definition example of the tag information by the relational database;

FIG. 8 is an illustrative diagram of an overview of a key-value type data store;

FIG. 10 is an illustrative diagram showing an example of a key configuration of tag information;

FIG. 14 is a table showing an example of bit allocation of point-of-view information;

FIG. 15 is an example of a variable bit sequence/character code conversion table;

FIG. 17 is an illustrative diagram showing an example of a class definition using Java (registered trademark) of tag information;

DESCRIPTION OF EMBODIMENTS

Figure 1:
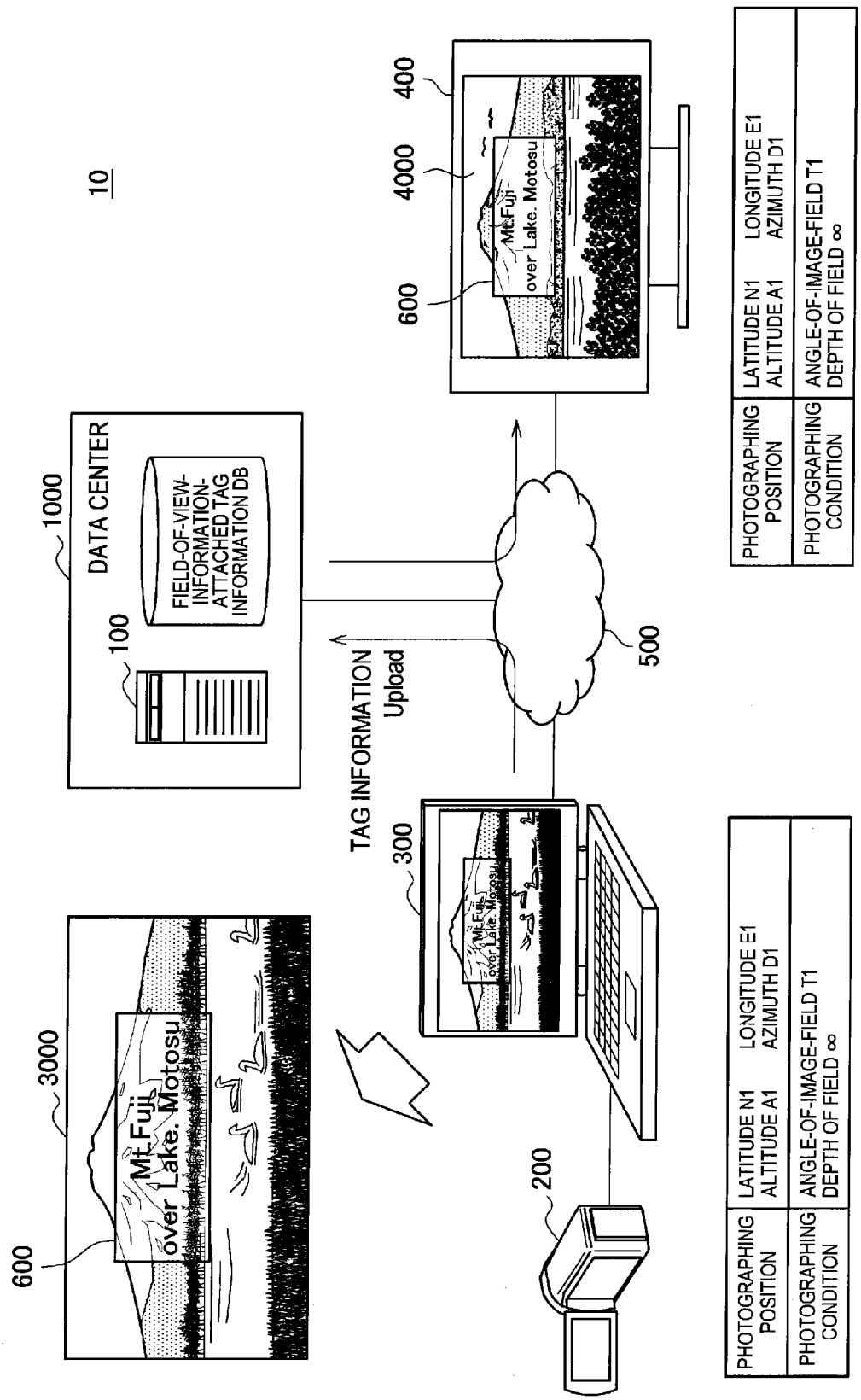
FIG. 1 is a configuration diagram showing a schematic configuration of an information processing system according to an embodiment of the present disclosure.

Preferred embodiments of the present disclosure will now be described in detail with reference to the appended drawings. In this specification and the drawings, elements having substantially the same functional configurations are denoted by the same reference numerals, and redundant description thereof is omitted.

Description is given in the following order.
1. Overview
2. Configuration
3. Tag Information Management Method by Relational Database
4. Tag Information Management Method by Key-value Type Data Store
5. Example of Effect
6. Application Example
<1. Overview>

First, an overview of an information processing system 10 according to an embodiment of the present disclosure will be described using FIGS. 1 to 3. FIG. 1 is a configuration diagram showing an overview of the information processing system 10 according to an embodiment of the present disclosure. FIG. 2 is a table showing an example of shooting-related supplementary information recorded in an imaging device. FIG. 3 is an illustrative diagram showing an example of advantageous effects of the information processing system 10.

The information processing system 10 according to this embodiment has an imaging device 200, which shoots video content, a terminal device 300, which is an information processing device to receive manipulation of assigning a tag to content 3000 input from the imaging device 200, or the like in response to a user's manipulation, a data center 1000 having a tag information generation server 100, which is an information processing device to generate tag information in which field-of-view information for specifying a field-of-view space when content is shot is added to information of the assigned tag, and a reproduction device 400, which performs reproduction by superimposing a tag using the tag information managed by the data center 1000 on a video. Each device within the data center 1000, the terminal device 300, and the reproduction device 400 are respectively connected via a network 500.

In the data center 1000, a server group for providing a moving-image sharing service is installed. The terminal device 300 can upload video content to a video distribution server, which is not shown within the data center 1000. The reproduction device 400 can download and reproduce video content distributed from the video distribution server within the data center 1000.

The user connects the imaging device 200 to the terminal device 300 using a universal serial bus (USB) or the like, and receives content data of a video 3000 from the imaging device 200 by application software of the terminal device 300. At this time, the terminal device 300 receives shooting information supplementary to the video 3000 along with the content data of the video 3000. The user uploads the video 3000 and the shooting information supplementary to the video 3000 to the video distribution server within the data center 1000 by the terminal device 300. The user can assign a tag 600 to the video 3000 by the terminal 300. The user uploads information of the tag 600 assigned by the terminal device 300 to the video 3000, for example, a position of the tag 600 on the video, character string information of the tag 600, and the like, to the tag information generation server 100 within the data center 1000.

Here, the imaging device 200 has, for example, a GPS function and an electronic compass function, and can record position information and azimuth information as well as shooting conditions such as a shooting time and date and a focal length as shooting information supplementary to a captured video. In a video camera based on an AVCHD standard, for example, shooting information shown in FIG. 2 is recorded in a modified digital video pack recorded as user data of an elementary stream (ES) of MPEG2-TS. The shooting information is periodically recorded at a predetermined time interval.

Only one terminal device 300 is shown here, but the data center 1000 can be accessed from a number of terminal devices 300. Likewise, in terms of the reproduction device 400, a number of reproduction devices 400 may access the data center 1000.

The reproduction device 400 reproduces a video in which a tag 600 is superimposed on another video 4000 captured in the same point-of-view and field-of-view as those of the video 3000. In the example of FIG. 1, the tag 600 having character string information "Mt. Fuji over Lake. Motosu" is superimposed and reproduced on the video 4000.

Information indicated by the above-described tag 600 is meaningful information on a video obtained by shooting the same field-of-view space from a point of view at which a video 3000 is captured. That is, it is not preferable to display the tag 600, for example, even in a video in which Mt. Fuji appears as a subject, if it is not a video in which Mt. Fuji is shown over Lake Motosu. For example, a video 4005 shown in FIG. 3 is a video of Mt. Fuji captured from Gotemba. In this case, Lake Motosu is not seen in the video 4005. Thus, it is not preferable to display the tag 600. A video 4010 is a video captured from a position near Mt. Fuji rather than a position where the video 3000 is captured. In this case, it is not preferable to display the tag 600 on the video 4010 even though the video 4010 and the video 3000 are captured at the same direction angle. A video 4015 is a video captured in the same shooting position as that of the video 3000. However, a video 4015 has shooting conditions different from the video 3000, and is a video obtained by capturing a view at a shorter distance than that of the video 3000. Even in this case, it is not preferable to display the tag 600 since Lake Motosu is not seen in the video 4015.

In a system of the related art, a tag is labeled to earth-based three-dimensional spatial coordinates of a subject. In this case, since the earth-based three dimensional spatial coordinate position of Mt. Fuji is identical, the tag 600 is also superimposed on videos like the video 4005, the video 4010, and the video 4015 shown in FIG. 3. However, the tag 600 is meaningful information on a video obtained by capturing the same field of view from the same point of view as described above. The information processing system 10 according to this embodiment manages the tag by associating the tag with a coordinate position on a field-of-view space of a captured video. Thus, the tag 600 is not superimposed on the video 4005 having a different point of view and a different azimuth, the video 4010 having a different point of view, and the video 4015, which has the same point of view and the same azimuth but has a different field-of-view space since shooting conditions are different.

Thus, meaningful information in a positional relation of a plurality of objects seen from a certain field-of-view space from the point of view as well as a simple name of an object can be shared as a tag.

Here, a video camera is shown as the imaging device 200, but the present disclosure is not limited thereto. For example, the imaging device 200 may be a device having a shooting function such as a mobile phone, a portable music playing device, a portable video processing device, or a portable gaming device. The case where the terminal device 300 is a personal computer (PC) is illustrated, but the present disclosure is not limited to this example. For example, the terminal device 300 may be any information processing device having a communication function and an input section through which the user input manipulation such as a home video processing device (a DVD recorder, a video tape recorder, or the like), a personal digital assistant (PDA), a home gaming device, a home appliance, a mobile phone, a portable music playing device, a portable video processing device, or a portable gaming device. Alternatively, if the imaging device 200 can have the communication function and can communicate with each device within the data center 1000, the imaging device 200 itself may also have a function of the terminal device 300.

Here, the content may be video content, still-image content, or moving-image content. The reproduction device 400 performs reproduction by superimposing a tag on a video distributed by a video sharing service provided by the data center 1000, but the present disclosure is not limited to this example. For example, the reproduction device 400 may perform reproduction by superimposing a tag on video content stored in a local storage section. Alternatively, the reproduction device 400 may superimpose a tag on a video during shooting in real time in a device also having an imaging function.

As described above, the information processing system 10 according to this embodiment manages a tag by associating the tag with a coordinate position on a field-of-view space from a point of view at which content is shot. Thus, only a tag associated with the same field-of-view space from the same point of view in the reproduction device 400 is superimposed. Thus, using this tag information, the reproduction device 400 can appropriately display meaningful information only in a video seen from a shooting position where the video is captured and an azimuth in which the video is captured by predetermined shooting conditions. A functional configuration of the tag information generation device 100 for exhibiting this effect will be described next.

<2. Configuration>

Figure 4:
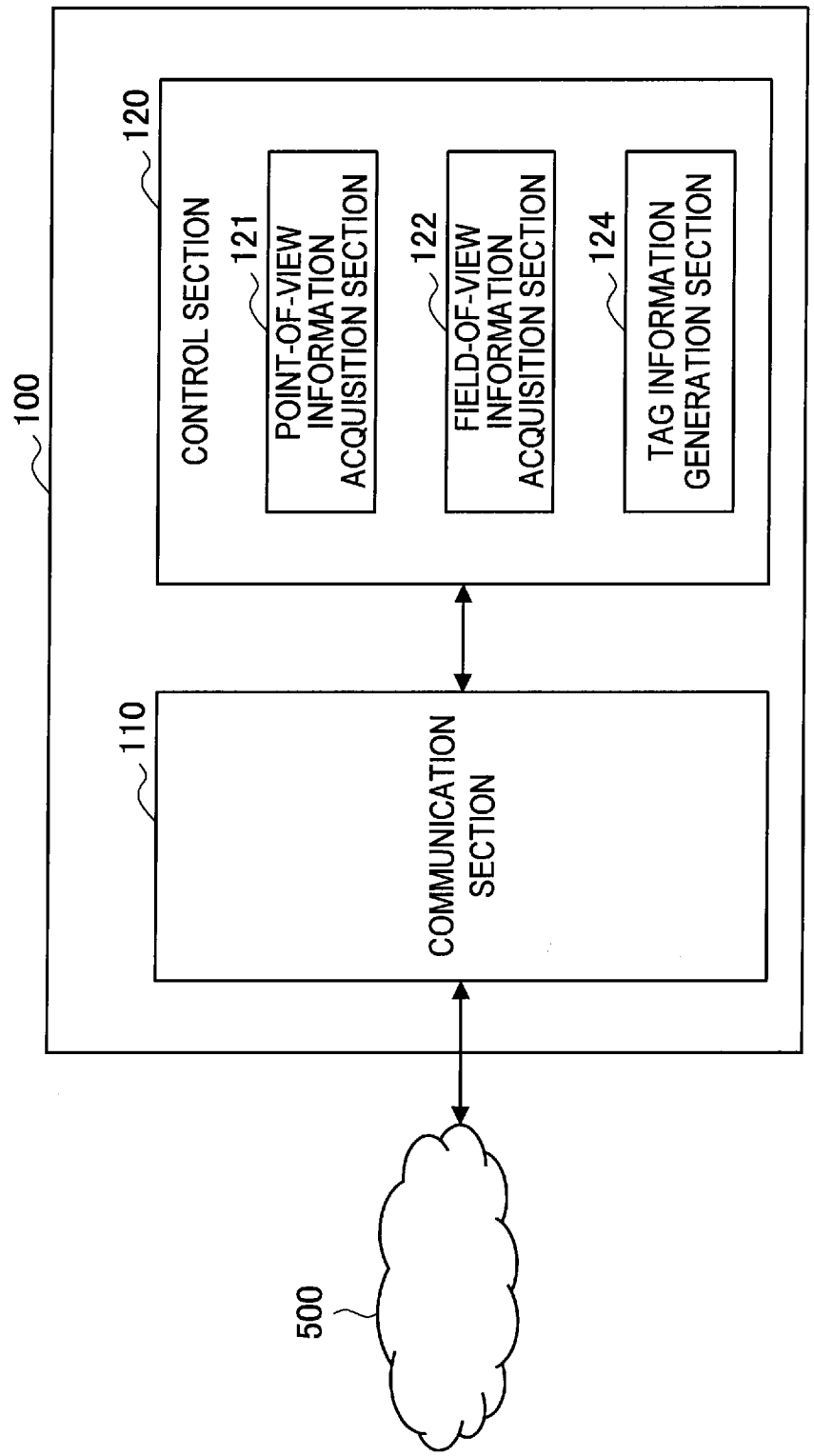
FIG. 4 is a block diagram showing a functional configuration of a tag information generation device.

FIG. 4 is a block diagram showing the functional configuration of the tag information generation device 100. The tag information generation device 100 is an information processing device mainly having a communication section 110 and a control section 120. The tag information generation device 100 generates tag information from a video analysis result.

Here, tag information generated in the tag information generation device 100 is information including shooting information including information of a shooting position, field-of-view information regarding a field of view from the shooting position, a coordinate position in a field-of-view space specified on the basis of the shooting position information and the field-of-view information, and character string information indicating content of the tag information.

To generate the above-described tag information, the control section 120 of the tag information generation device 100 mainly has functions of a point-of-view information acquisition section 121, a field-of-view information acquisition section 122, and a tag information generation section 124.

The point-of-view information acquisition section 121 acquires point-of-view information indicating a position (hereinafter, referred to as a point-of-view position) of an imaging device, which shoots content. For example, the point-of-view information acquisition section 121 acquires the point-of-view information from shooting information, which is information indicating shooting conditions supplementary to video content data. As described above, the shooting information is information recorded by a function of the imaging device 200. For example, the point-of-view information acquisition section 121 extracts and acquires the point-of-view information from the shooting information supplementary to the video content data stored in the video distribution server storing a video uploaded from the terminal device 300. Alternatively, the point-of-view information acquisition section 121 may acquire the point-of-view information by directly acquiring the video content data from the terminal device 300 that uploads the video.

Here, the point-of-view information is information of a longitude, a latitude, and an altitude acquired from a position acquisition device such as a GPS, for example, indicated by the world geodetic system (WGS) or the like. The point-of-view information may include information of error precision of the position information.

The field-of-view information acquisition section 122 acquires field-of-view information indicating a field-of-view space when content is shot from a point-of-view position. For example, the field-of-view information acquisition section 122 acquires field-of-view information from shooting information supplementary to the video content data.

Here, for example, the field-of-view information includes information of an azimuth from the point-of-view position and a field-of-view angle. For example, azimuth information acquired by an electronic compass having an imaging device is used in the azimuth from the point-of-view position. The information of the field-of-view angle becomes a value corresponding to setting of the imaging device. The information of the azimuth and the field-of-view angle is acquired from the shooting information supplementary to the video content data.

The tag information generation section 124 generates tag information associated with a coordinate position on a field-of-view space specified by point-of-view information, field-of-view information, and depth information of the field-of-view space. For example, the tag information generation section 124 generates the tag information including character string information of a tag acquired from the terminal device 300 via the communication section 110, information of a tag position in a video, the point-of-view information, the field-of-view information, and information of a distance to an object to which the tag is assigned from a point of view.

Here, the depth information of the field-of-view space is a distance to a shot object in content. In terms of a subject distance, for example, if a value of the subject distance can be acquired from shooting information supplementary to the content, the acquired subject distance value is used. A hyperfocal distance calculated on the basis of shooting information of the content may be used.

A detailed operation of each section of the above-described tag information generation device 100 differs according to a tag information management method. Here, two management methods including a most widely used management method by a relational database and a management method by a key-value type data store suitable for larger-scale data management or distribution processing will be respectively described next.

<3. Tag Information Management Method by Relational Database>

Figure 5:
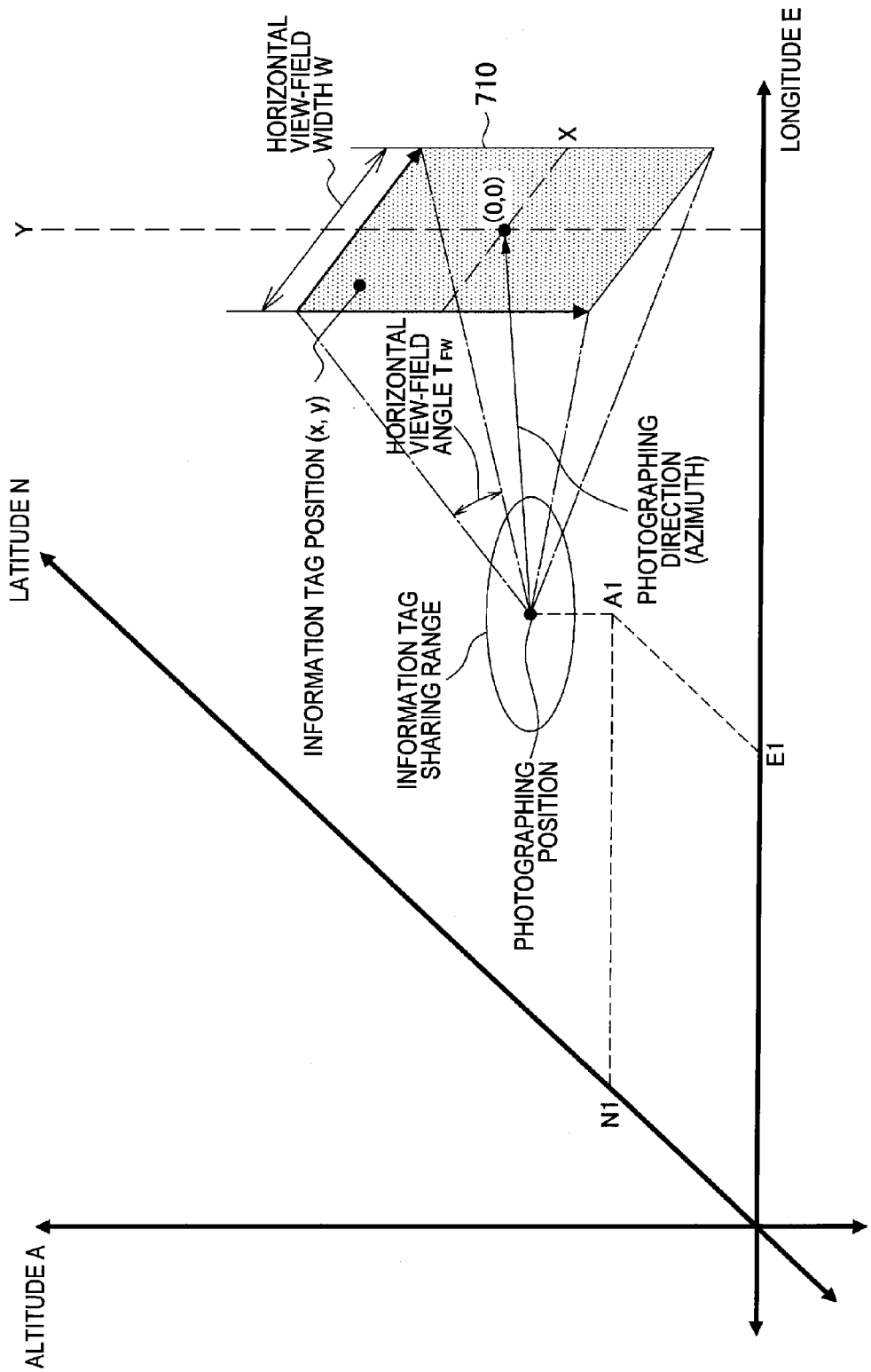
FIG. 5 is an illustrative diagram showing a spatial model of tag information when a relational database is used.

First, the tag information management method by the relational database will be described using FIGS. 5 and 6. FIG. 5 is an illustrative diagram showing an example of a spatial model of a tag when tag information is managed by the relational database. FIG. 6 is an illustrative diagram showing an example of a table definition of the relational database in which tag information defined by the spatial model of FIG. 5 is managed.

In this embodiment as described above, the tag is labeled onto a three-dimensional space of a field of view of the video on the basis of a point of view, which is a position of the imaging device capturing a video to which the tag is added. The point of view is information of a longitude, a latitude, and an altitude indicated by the WGS. In this case, the point of view is a latitude N1, a longitude E1, and an altitude A1. The position on the three-dimensional space of the field of view is expressed by a position on a two dimensional field-of-view plane, which is obtained by orthogonally arranging captured videos with center points of the captured videos being matched with each other using a shooting direction vector as an axis, by defining the field-of-view plane by means of a horizontal angle of view and a distance from the point of view.

Coordinates of the field-of-view plane are defined by a horizontal X axis and a vertical Y axis, and the center point is designated as (0, 0). A resolution W of a horizontal direction of an image becomes a horizontal resolution. A position of the field-of-view plane of the tag is expressed by (X, Y).

It is possible to share the tag with another video and superimpose and use the tag by performing a search from a database under conditions of a point-of-view position of the video, a field-of-view angle, an azimuth, and a short distance from a point of view to an object to which the tag is added. In addition to the position information and the azimuth information, a search for tag information by the field-of-view angle and the distance from the point of view is important in determining whether or not there is tag information for a subject on which a viewer focuses.

Next, an example of a table definition of a relational database in which the tag information defined by the above-described spatial model is managed will be described with reference to FIG. 6. Each row of the table of FIG. 6 indicates 1 record of an information tag. Columns of the table are classified into three of point-of-view information, field-of-view information, and an information tag.

The point-of-view information has the columns of a longitude, a latitude, an altitude, and an error. The latitude has a value of a range from −90 degrees to 90 degrees of a floating point, north latitudes are expressed as positive values, and south latitudes are expressed as negative values. The longitude has a value from −180 degrees to 180 degrees of a floating point, east longitudes are expressed as positive values, and west longitudes are expressed as negative values. The altitude is a meter value expressed as an integer. Here, the error is a value in which the precision of position information is expressed as a meter value. The error is calculated from a value of dilution of precision (DOP) in the GPS. If the error is unclear, a value of −1 is input.

The field-of-view information has the columns of an azimuth, a field-of-view angle, a height and a width. The azimuth indicates an angle of a shooting direction. A value of the azimuth is between 0 and 360 degrees by a floating point, the north is designated as 0 degrees (360 degrees), the east is expressed as 90 degrees, the south is expressed as 180 degrees, and the west is expressed as 270 degrees. The field-of-view angle is expressed as the number of degrees of a floating-point decimal number. The height and the width are horizontal and vertical resolutions of a captured video, and are expressed as pixel values. For example, in a full high-vision video, vertical and horizontal resolutions are 1920 and 1080, respectively. A video resolution can be acquired from shooting information supplementary to content data. If the field-of-view angle is 2T, it is obtained from the following relation.

$$\tan T = (\text{Shooting Element Frame Size})/(\text{Focal Length})$$

The information tag has the columns of a distance, an X coordinate value, a Y coordinate value, and a tag name. The distance is a distance from a point of view on a field-of-view space, and is expressed in a meter unit as an integer. The X coordinate value and the Y coordinate value are positions on the field-of-view plane described with reference to FIG. 5, and are expressed as pixel values. The tag name is expressed as a character string. The tag name is information to be shared by the tag.

A tag distance may not be measured for every tag. Thus, a subject distance of a captured video is simply used as the tag distance. For the subject distance, a value of a subject distance tag of shooting-related supplementary information shown in FIG. 2 in the case of a moving image or image information recorded in an EXIF file in the case of a still image may be used. If the subject distance is not acquired from the above-described information, a hyper-focal distance calculated using the following equations can be used as the tag distance.

Permissible Confusion Circle Diameter=Diagonal Image Element Size/Permissible Confusion Circle Constant (=1300)

Hyper-focal Distance=(Focal Length*Focal Length)/(Permissible Confusion Circle Diameter*F Value) (Unit: mm)

If a focal length "FocalLengthIn35 mm" tag of 35 mm conversion is recorded in the EXIF information, a diagonal size of an imaging element in a 35 mm film is known to be 43.266615 mm. Thus, the hyper-focal distance is calculated using an aperture F value recorded on an "ApertureValue" tag.

Alternatively, a distance measured using measurement technology for a focal length of each subject by analyzing a captured video may be used as the tag distance. For example, if a device capable of recording parallax information like a 3D camera is used, a value obtained by analysis using the information may be used as the tag distance.

It is possible to manage a tag added to an image using the relational database of the table definition of FIG. 6 according to the spatial model of FIG. 5 as described above. However, a feature of the relational database as described above is that it may not easily perform large-scale data management and distribution processing. Here, a method of managing tag information by applying proper cloud computing technology when an amount of information serving as an object to be managed is large is next proposed.

<4. Tag Information Management Method by Key-Value Type Data Store>

Figure 7:
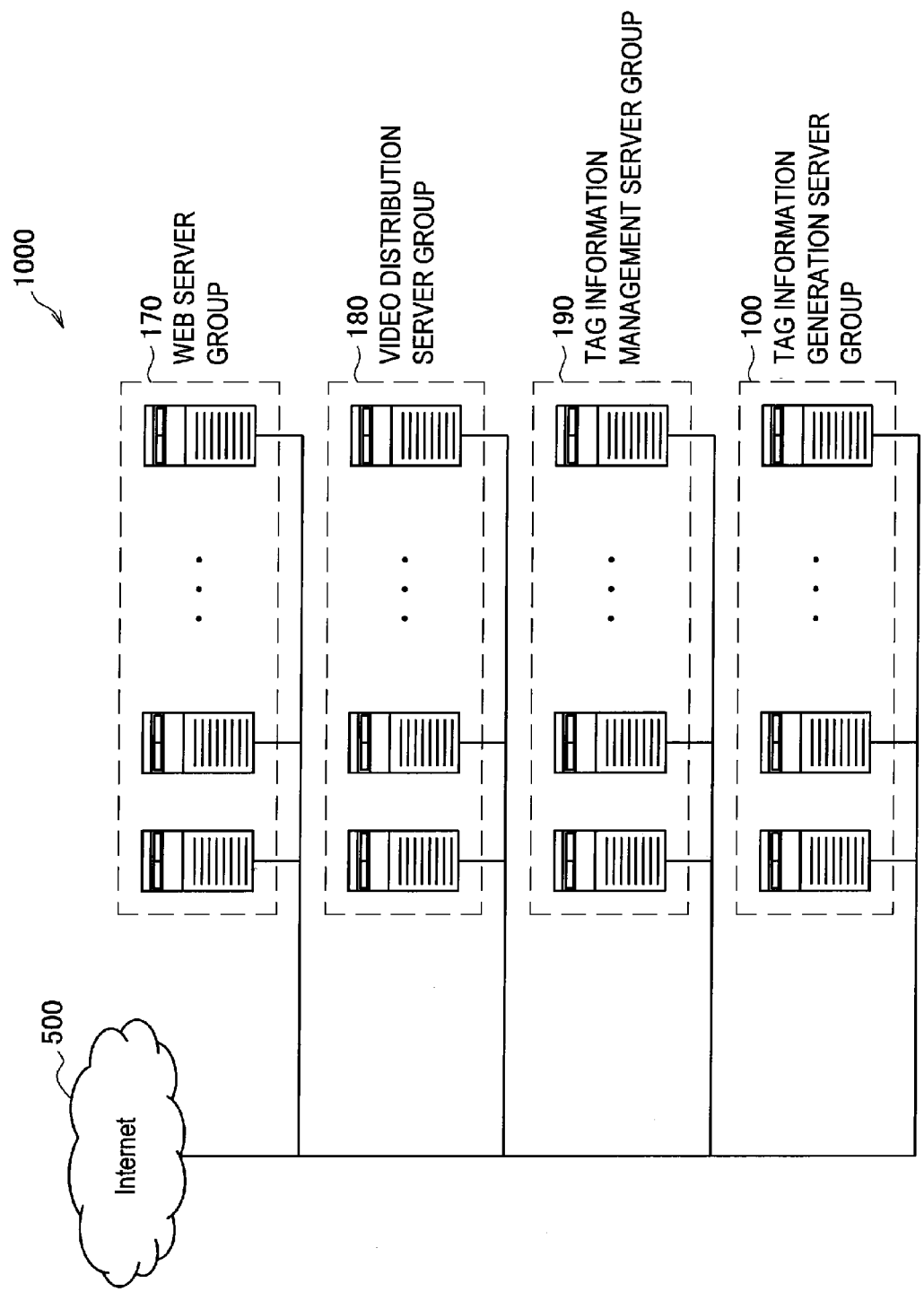
FIG. 7 is a configuration diagram of a data center.

FIG. 7 is a configuration diagram within a data center for providing a content sharing service according to this embodiment. To provide a video content sharing service, it is necessary to perform image conversion processing of a large amount of uploaded video content data, manage records, and process access to video content data from a large number of users. Thus, a tag information management method using a large-scale distribution processing type of cloud computing technology is proposed.

The data center 1000 has a plurality of web servers 170, a plurality of video distribution servers 180, a plurality of tag information management servers 190, and a plurality of tag information generation servers 100.

The web server 170 provides an HTML document and VR information to be displayed on a browser of the terminal device 300. The video distribution server 180 distributes a video to a reproduction device. The tag information management server 190 manages tag information generated by the tag information generation server 100 in the key-value type data store. The tag information generation server 100 generates the tag information suitable for being managed in the key-value type data store. It is beneficial to use cloud computing technology for restrictively processing a large amount of content data and access from the terminal device. In this embodiment, a method of managing tag information using a key-value type data store known to be suitable for distributed cloud computing is used.

As shown in FIG. 8, the key-value type data store manages data by a simple table having a pair of a key and a value in a row. As compared to the relational database, the key-value type data store has a feature that a large amount of data can be distributed and processed by a plurality of servers on the basis of key values without supporting a search using a complex data structure definition or a relational function. Recently, this key-value type data store has started to be used in an Internet service targeted at a large number of clients.

In the key-value type data store, the table is sorted and managed by key values. Thus, in order to perform high-speed and low-load processing, it is significantly effective to devise the format of a key value so that related data is localized in part of the table.

(Spatial Model)

Figure 9:
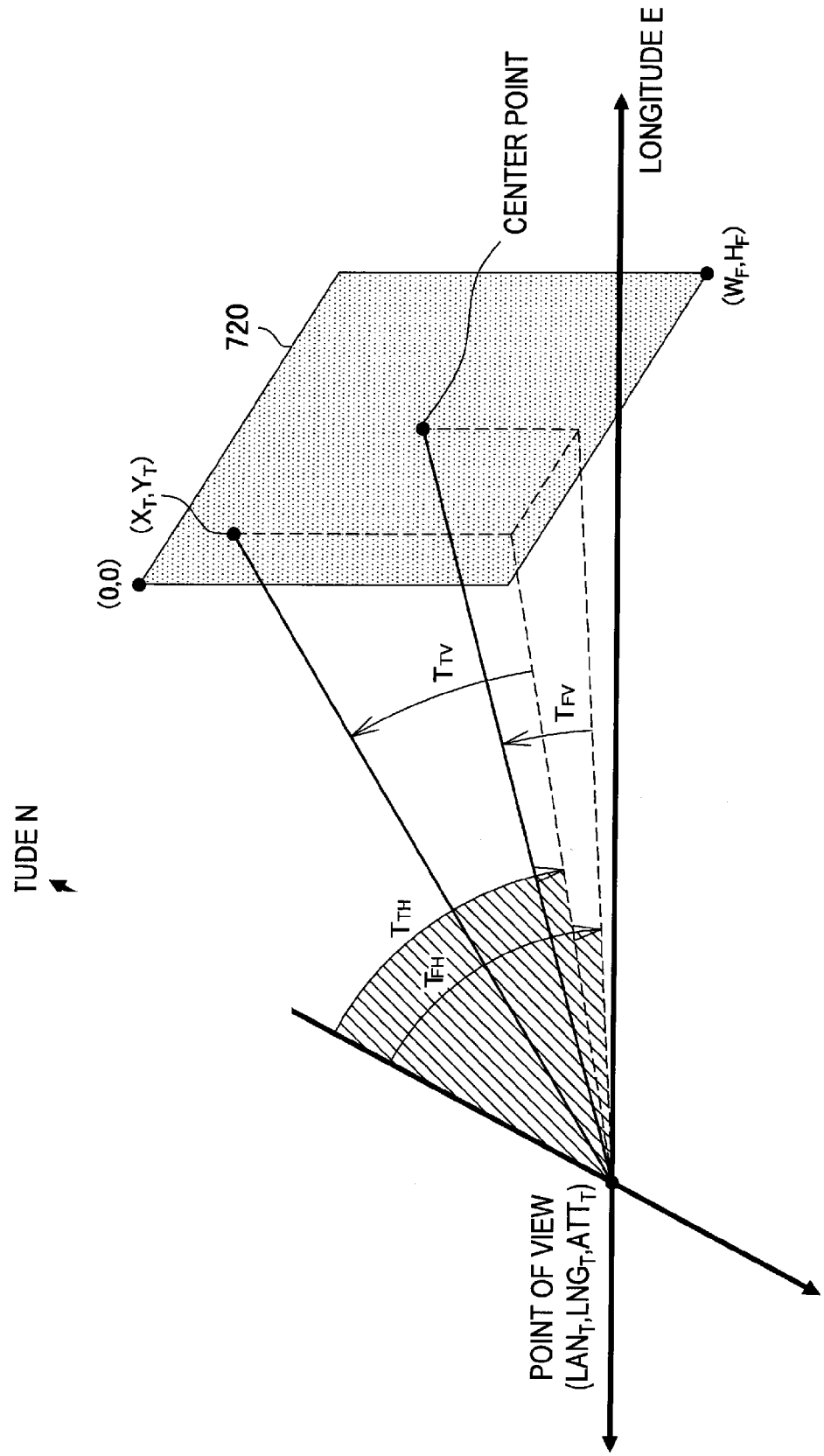
FIG. 9 is an illustrative diagram showing a spatial model of tag information when the key-value type data store is used.

FIG. 9 is a spatial model showing spatial coordinates of a tag to be used when tag information is managed by the key-value type data store in this embodiment. In this spatial model, the tag position information is indicated by point-of-view position information (a latitude $LAN_T$, a longitude $LNG_T$, and an altitude $ATT_T$) and azimuth information (a horizontal azimuth angle $T_{TH}$ and a vertical azimuth angle $T_{TV}$) from a point-of-view position.

Conversion from coordinates on the spatial model shown in FIG. 5 into spatial coordinates shown in FIG. 9 is performed by the following equations. Correction is necessary when an azimuth is across the true north.

Horizontal Azimuth Angle of Tag: $T_{TH} = T_{FH} + T_{FW} * (X_T/W_F - \frac{1}{2})$ Vertical Azimuth Angle of Tag: $T_{TV} = T_{FV} + (T_{FW} * H_F/W_F) * (\frac{1}{2} - Y_F/H_F)$ Here, the symbols have the following meanings.
Coordinates on Image Plane of Tag: $(X_T, Y_T)$
Shooting Horizontal Angle of view of Image: $T_{FW}$
Number of Horizontal Pixels of Image: $W_F$
Number of Vertical Pixels of Image: $H_F$
Pixel Aspect Ratio: 1:1
Shooting Horizontal Azimuth Angle of Image: $T_{FH}$
Shooting Vertical Azimuth Angle of Image: $T_{FV}$ Azimuth angle information of the vertical direction has a value from 0 to 180 degrees by designating a bottom position as a base point. Here, for convenience of description, the horizon is expressed as 0 degrees, an upper direction is expressed as a positive angle, and a ground direction is expressed as a negative angle. If the azimuth angle information is not included in shooting information supplementary to content data and is unclear, a vertical azimuth angle may be simply allocated from an angle of view and a subject distance.

(View Hash)

If the tag information is managed by the key-value type data store, point-of-view information and field-of-view information are used in part of a key, and it is necessary to search for data by the above-described information. Thus, it is possible to efficiently encode the longitude, the latitude, the positional precision, the field-of-view angle, the field-of-view direction, and the tag distance into character strings using a view hash proposed this time.

A view hash configuration is shown in FIG. 10. In a view hash bit sequence, bit sequences indicating position information, positional precision, field-of-view information, and a subject distance as a distance to a tag are sequentially arranged. A bit sequence of the position information is generated from values in which coordinates of a longitude (from −90 degrees to 90 degrees) and a latitude (from −180 degrees to 180 degrees) are expressed by resolution precision. If the number of bits of the resolution precision is denoted by R and a longitude and a latitude of a bit are denoted by n and e, values of a longitude N and a latitude E expressed by the resolution precision are obtained from the following equations.

$$N = 180*(n+90)/2R-1$$

$$E = 360*(e+180)/2^R$$

N and E values are floating-point decimal numbers and n and e are set as integer values by truncation after the decimal point. The resolution precision of the longitude is set to be ½ of the resolution system of the latitude in order to set a partition on a resolved map to be close to a square.

As shown in FIG. 10, a bit sequence of the position information has a format in which a bit sequence ($E-b_n$, $E-b_{n-1}$, ... $E-b_1$, $E-b_0$) of the longitude and a bit sequence ($N-b_{n-1}$, ... $N-b_1$, $N-b_0$) of the longitude obtained in the equations are alternately arranged. Here, most significant bits are respectively $E-b_n$ and $N-b_{n-1}$.

An earth-based geographic partition can be specified by setting the bit sequence of the position information in the above-described format, a position of the partition can be indicated by a small bit sequence, and also a length of the partition can be expressed. In this embodiment, GPS positional precision is considered to be 1 meter to 100 meters and R uses a value from 22 to 25. At this time, the position information is a minimum of 43 bits and a maximum of 49 bits.

Figure 11:
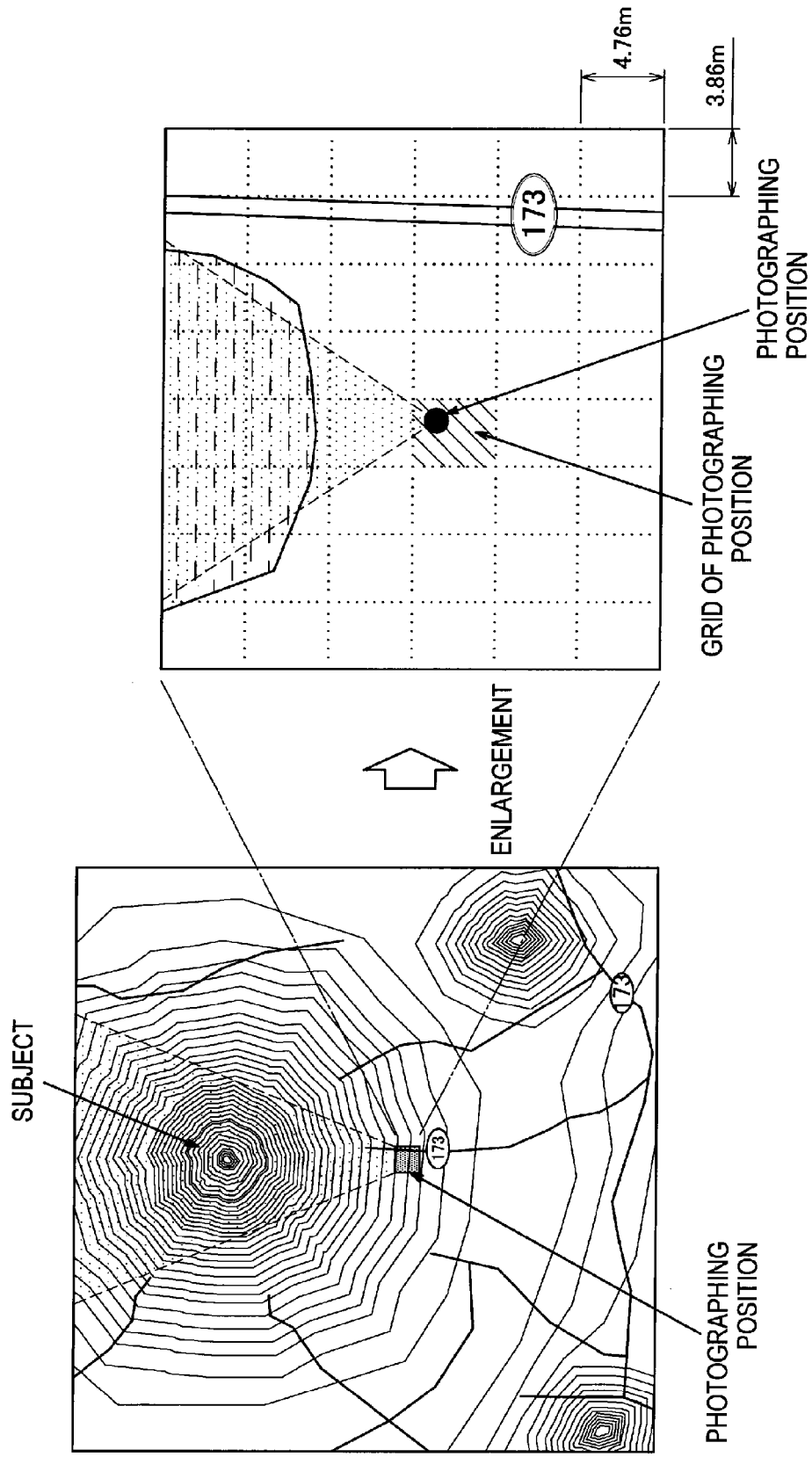
FIG. 11 is an illustrative diagram showing an example of a grid of a shooting position.

FIG. 11 is an illustrative diagram showing an example of a divided geographic partition when the number of bits of the position information is 45. A length of a north-south direction of the geographic partition is fixed regardless of the longitude, and is about 4.75 meters. On the other hand, a length of an east-west direction of the geographic partition depends upon the latitude and becomes 3.86 meters around a longitude of 35 degrees of Tokyo or the like. On the other hand, a length of an east-west direction of the geographic partition becomes about 2.35 meters around a latitude of 60 degrees of Stockholm or the like.

The positional precision is expressed by a bit sequence indicating a value by which to multiply the distance of the north-south direction of the geographic partition specified by a bit sequence of the position information, $D-b_7$ is the most significant bit, and $D-b_0$ is the least significant bit. If the value by which to multiply the distance of the north-south direction of the geographic partition specified by a bit sequence of the position information is 1, a value of the bit sequence is 0. If the value by which to multiply the distance of the north-south direction of the geographic partition specified by a bit sequence of the position information is greater than 1 and equal to or greater than 2, the value of the bit sequence becomes 1. If the value by which to multiply the distance of the north-south direction of the geographic partition specified by a bit sequence of the position information is greater than 2 and equal to or less than 4, the value of the bit sequence becomes 3. If the value by which to multiply the distance of the north-south direction of the geographic partition specified by a bit sequence of the position information is greater than 4, the value of the bit sequence becomes 4. A bit number of a position error becomes 0.

Figures 12, 13:
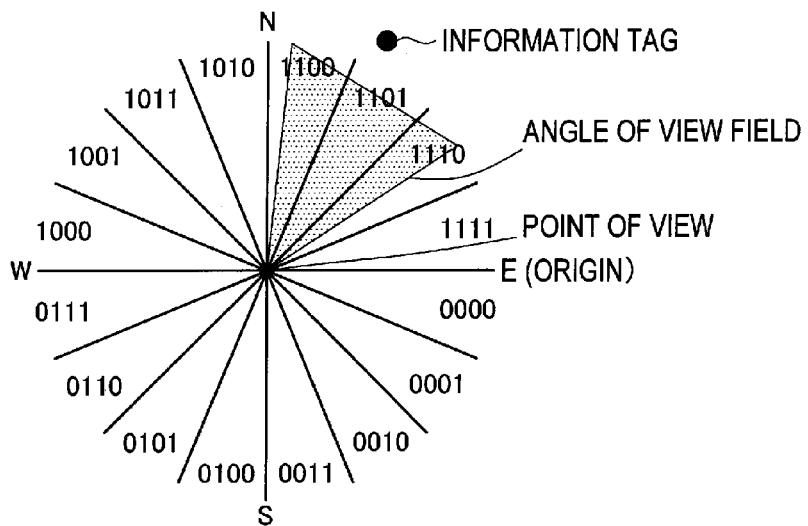
FIG. 12 is an illustrative diagram of field-of-view information bits.
FIG. 13 is a table showing an example of bit allocation of field-of-view information.

The field-of-view information is information indicating a field of view to which a tag azimuth belongs. As shown in FIGS. 12 and 13, the field-of-view information is a sequence of 4 to 6 bits, and is denoted by a bit sequence indicating a value obtained by dividing coordinates of 360 degrees in a clockwise azimuth having the starting point of the true east by resolution precision. If the number of degrees of the clockwise azimuth having the starting point of the true east is denoted by d and the bit precision of the resolution precision is denoted by A, the field-of-view information D is calculated by the following equation. The azimuth is expressed by designating the true north as the starting point for convenience in the following description, but all values converted by designating the true east as the starting point are actually used.

$$D = 360*d/2^A$$

In this embodiment, the number of bits of resolution precision has 4, 5, and 6 in three types, and the number of bits may be different in response to a field-of-view angle. A space of 360 degrees is divided into 22.5 degrees, 11.25 degrees, and 8.125 degrees by the number of bits. In this embodiment, the number of bits is changed in response to a captured angle of view of an image to which a tag is added. If the angle of view is equal to or greater than 46 degrees, 4-bit precision may be allocated. If the angle of view is less than 46 degrees and equal to or greater than 18 degrees, 5-bit precision may be allocated. If the angle of view is less than 18 degrees, 6-bit precision may be allocated. The number of bits indicates which azimuth it belongs to in a state in which the space of 360 degree is divided into 22.5 degrees, 11.25 degrees, and 8.125 degrees. FIG. 12 shows a bit number of each azimuth in the case of 4 bits. For example, if north-northwest is 315 degrees in a horizontal azimuth of the information tag, the field-of-view information becomes a bit value of 1101. When azimuth information is unclear, the bit number becomes 0.

As described above, it is possible to recognize information of a field-of-view angle from the number of bits of the field-of-view included in a key by causing the number of bits of the field-of-view information to be different in response to a field-of-view angle and using the field-of-view information indicated by bits as part of a key of key-value type data. Since information of the field-of-view angle can be recognized, it is possible to more accurately know a shooting range within each video content.

The subject distance is expressed by 8 bits of a meter value, and is used as a value obtained by calculating a distance to a subject on the basis of shooting information supplementary to the content data as described above. Strictly speaking, a hyper-focal distance of a captured image is not identical with a distance of the tag information, but an error is handled to be included in the original distance information. The distance that is equal to or greater than 255 meters is designated as 255, and the bit number becomes 0 if the distance information is unclear.

FIG. 14 is an illustrative diagram showing an allocation scheme of the number of bits of the position information. In order to efficiently perform a search by a key of the key-value type data store, it is effective to decide a key value suitable for a tag information search scheme. In this embodiment, the number of position bits of the view hash constituting a tag key value is changed by the number of field-of-view bits of the tag and the distance information. For example, if the number of bits of the field-of-view information is 3, a video to which the tag is added is taken at a wide angle. If the subject distance is far (over 100 m), 43-bit position information is used since tag information can be used even when the precision of position information is bad. On the other hand, if the number of bits of the field-of-view information is 5, that is, if the tag information is added to a video captured in a super telescope, the number of bits of position information used at all distances is 49 since the precision of position information is also necessary. It is possible to efficiently search for beneficial tag information by changing the number of bits of the position information as described above. Since a position error of the tag depends upon the number of bits of the position information as described above, it is possible to decide the number of bits of the position information of the view hash to be used in the search of the tag information by the positional precision of a point of view of a comparison/contrast. A tag search will be described below in detail.

Each bit sequence constituting the view hash can be obtained as described above. However, in order to use the bit sequence as a key value of the key-value type data store or in order to use the bit sequence as URL or the like, it is easy to handle the expression by a character string. Thus, the bit sequence is encoded into the character string. For example, there is a method using BASE64 so as to encode the bit sequence into the character string. However, in this embodiment, a variable bit sequence/character code conversion scheme is proposed so that data can be sorted by a key value depending upon each bit sequence.

Here, the proposed variable bit sequence/character code conversion scheme has a feature that a segment of each bit sequence can be identified when a key is generated by connecting a variable-length bit sequence. Thus, even when the bit sequence converted into the code character using this scheme is directly connected, a segment of each information can be identified. Thus, it is possible to perform a search on the basis of information values when the bit sequence is used as a key of the key-value type data store.

FIG. 15 shows an example of a variable bit sequence encoding/conversion table. In this conversion scheme, information includes a plurality of variable-length bit sequences (0 or more bits). The conversion scheme is effective in identifying a boundary of the bit sequences. This conversion scheme will be described. In each variable-length bit sequence, fragments are sequentially extracted in a 4-bit unit from the most significant bit and are replaced by character codes (U to z) corresponding to 4-bit values. If the number of bits of an extracted fragment is under 4, 3 bits, 2 bits, and 1 bit are respectively replaced by character codes (E to T), (6 to D), (2 to 5), and (0, 1). When the four bits of the last extracted fragment or the number of bits of a corresponding bit sequence is 0, a character code "–" (dash) is added. Of course, the conversion table shown here is exemplary. As long as the bit sequence and the code character are defined in one-to-one correspondence, various types of modified examples are possible.

Figure 16:
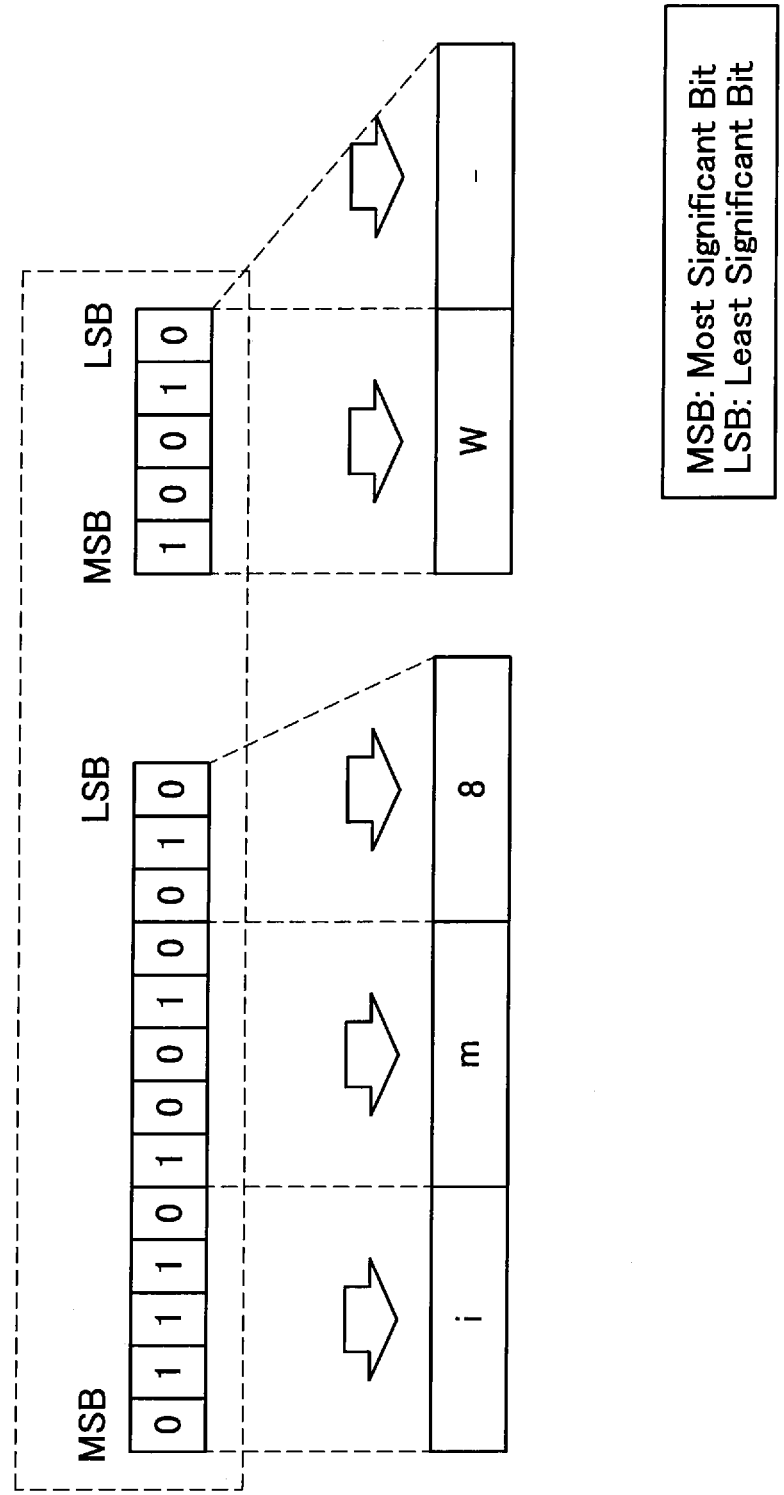
FIG. 16 is an illustrative diagram showing an example of conversion of a variable bit sequence into a character string.

FIG. 16 shows a conversion example. If information before conversion includes two bit sequences, which are respectively "0111010010010" and "10010," a character string after conversion becomes "im8W–." Something converted into a character string is used as a view hash value shown in FIG. 10 by the conversion scheme.

By the view hash, a three-dimensional space of a field of view divided by any precision can be uniquely specified by designating a center of a partition on terrestrial coordinates divided by any precision as a point of view. A method of managing tag information in the key-value type data store using the view hash will be described.

Next, a table of the key-value type data store according to this embodiment will be described. The table of the key-value type data store used in this embodiment forms a pair of a "Key" value and a "Value" value as shown in FIG. 8. FIG. 17 shows a Java (registered trademark) class definition used to manage tag information as key-value type data. A tag class indicates tag information and includes a key class and a value class, which are inner classes. A pair of the key class and the value class are managed in the data store as key-value.

Real data of the key class is a variable key, and the key is a character string obtained by connecting a view hash, a character string type, and a character string timestamp generated from tag information. The type is used to appropriately sort tag information of the same view hash value. In this embodiment, priority in which the tag is displayed is designated as a type value, and a 0-bit priority value is a character string generated by the conversion table of FIG. 15. A main purpose is to allocate a unique key to tag information of the same view hash value. A time and date generated by the tag are obtained by the same 8-byte value as that of a date class of Java (registered trademark), and are generated by a character string using the conversion table of FIG. 15.

Real data of the value class is the following variables.
name: a character string of a tag name
type: priority of tag display (the same value as that used in key generation)
timeStamp: a tag generation time and date (the same value as that used in key generation)
tagPosition: a point-of-view position of a tag (for example, $LAN_T$, $LNG_T$, $ATT_T$, or the like of FIG. 10
tagDirection: an azimuth of the tag from a point of view (for example, $T_{TH}$ or $T_{TV}$ of FIG. 10
tagSource: image information serving as a base from which tag information is generated and screen information coordinates of the tag
Real data of the tag source class is the following variables.
ImageSource: image information
tagX: an X coordinate value of a tag of an image plane (for example, $X_T$ of FIG. 10
tagY: a Y coordinate value of the tag of the image plane (for example, $Y_T$ of FIG. 10
Real data of the image source class is the following variables.
url: a unique resource locator (URL) of an image file (a still image or a moving image)
imagePosition: coordinates of a point of view at which an image is captured (for example, the same as $LAN_T$, $LNG_T$, $ATT_T$, or the like of FIG. 9)
imageDirection: an azimuth from the point of view to a center point of the image (for example, $T_{FH}$ or $T_{FV}$ in FIG. 9)
scene: image information of an image file (a still image or a moving image)
Real data of the scene class is the following variables.
frame: a frame value is 0 in the case of a still image and an image frame is denoted by a time (msec) from the beginning in the case of a moving image
angleHorizontal: a shooting horizontal angle of view of an image (for example, $T_{FW}$ of FIG. 9)

width: the number of horizontal pixels of the image (for example, $W_F$ of FIG. 9)

height: the number of vertical pixels of the image (for example, $H_F$ of FIG. 9)

Real data of the view position is the following variables.

latitude: a latitude of a point of view longitude: a longitude of the point of view altitude: an altitude of the point of view (millimeter unit)

range: an error of the point of view (millimeter unit)

The real data of the view direction is the following variables.

directionHorizontal: a horizontal azimuth from a point of view to an object point directionVertical: a vertical azimuth from the point of view to the object point distance: a distance from the point of view to the object point (millimeter unit)

Figure 18:
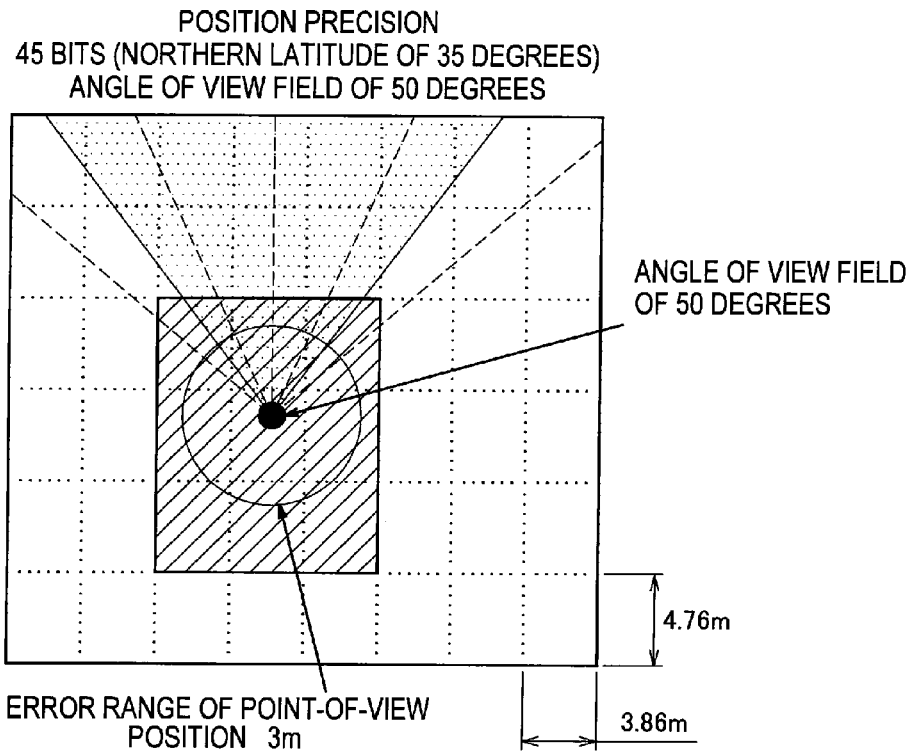
FIG. 18 is an illustrative diagram showing an example of a tag information search method (a latitude of 35 degrees north)
Figure 19:
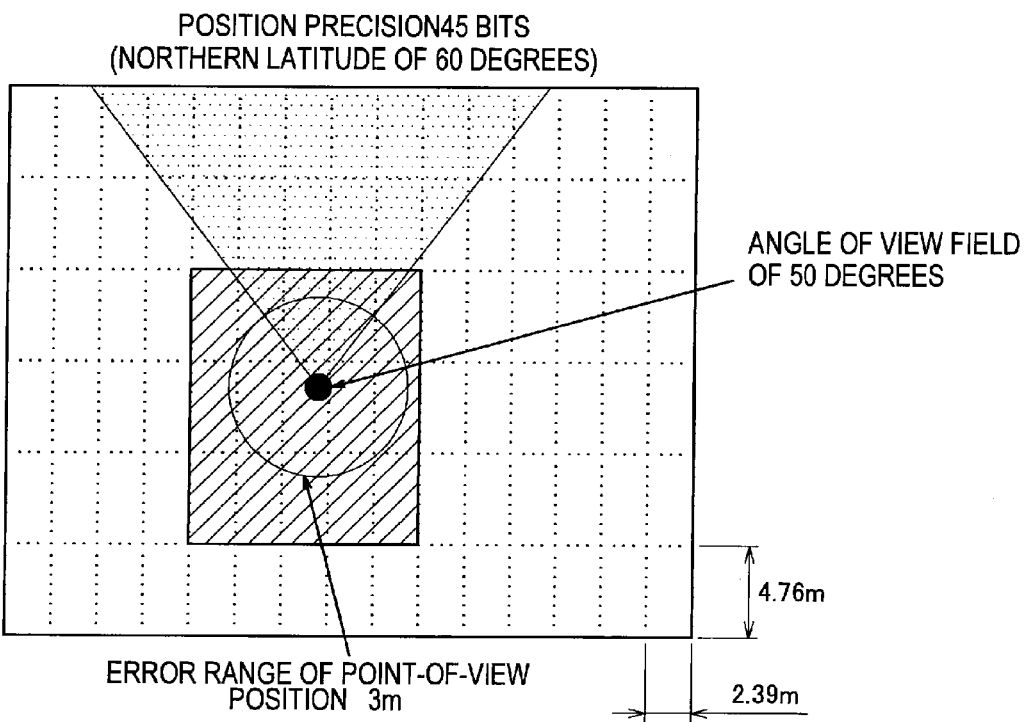
FIG. 19 is an illustrative diagram showing an example of a tag information search method (a latitude of 60 degrees north)

Next, FIGS. 18 and 19 are illustrative diagrams showing an example of a tag information search. FIG. 18 shows the case where true north is shooted at an angle of view of 50 degrees from a point-of-view position (a latitude of 35 degrees north, which is the same as that of Tokyo), but a tag is found for each field of view specified by field-of-view information bits shown in FIG. 13 for a field-of-view azimuth and an angle of view. In this example, it is necessary to search for the field of view with respect to four field-of-view divisions divided into 25 degrees. Even when a measurement error of the field-of-view position is equal to or less than a length of the north-south direction of a partition specified by position information bits, it may be actually located in a peripheral partition due to the error if the point-of-view position is present in an edge of the partition. Thus, it is necessary to search for a partition peripheral to a specified partition. If the error is 3 m, it is necessary to search for a total of 9 partitions. In this case, 32 (=4*8) manipulations are performed in the search.

FIG. 19 shows an example in which a point-of-view position is a latitude of 60 degrees north near Stockholm. In this case, since an east-west direction of a partition is shorter than that of the above case, it is necessary to search for a partition of a wider range even at the same position error precision.

Figure 20:
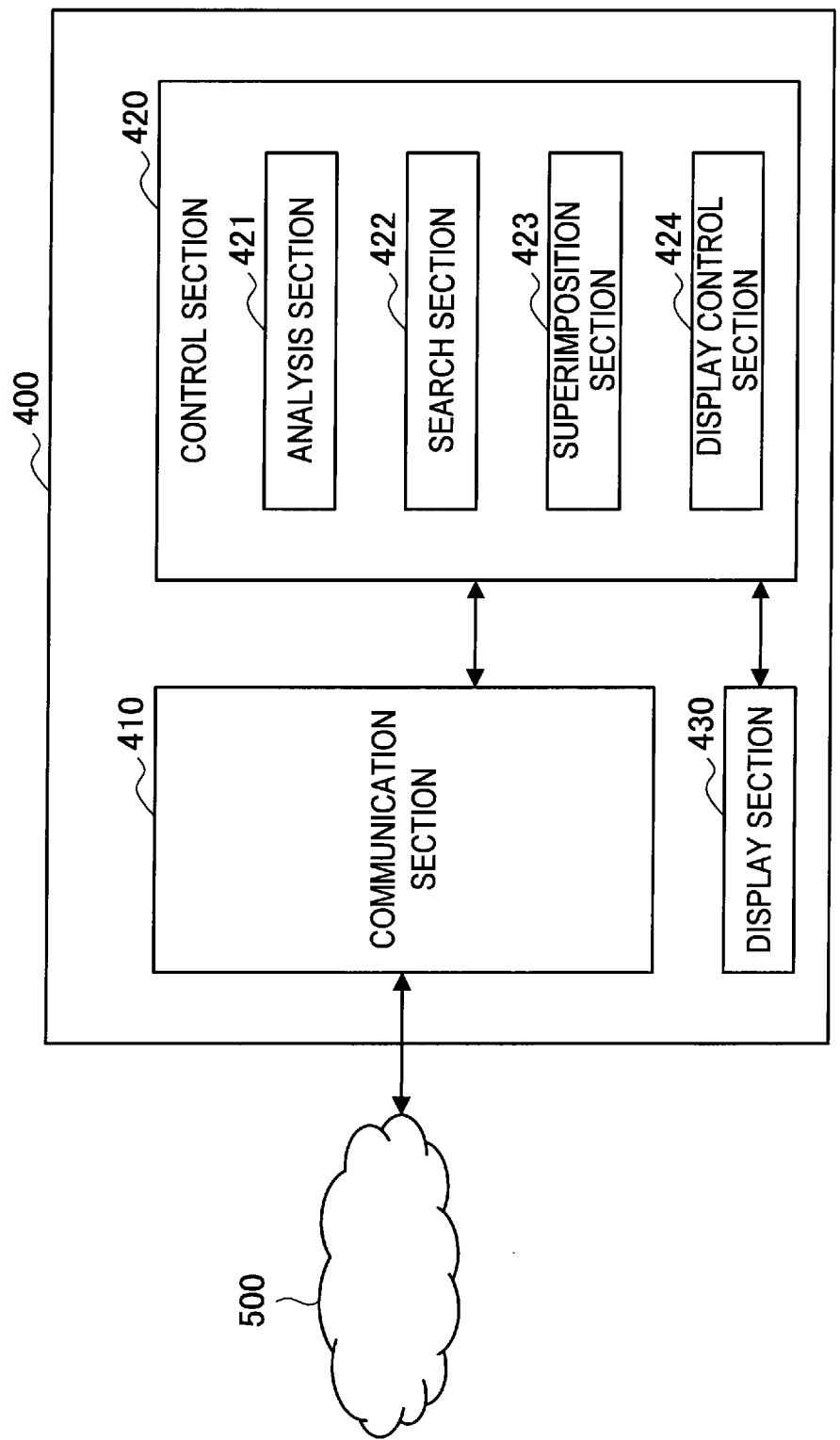
FIG. 20 is a block diagram showing a functional configuration of a reproduction device.

Next, a functional configuration of a reproduction device that performs the above-described search processing will be described. FIG. 20 is a block diagram showing a configuration of the reproduction device 400. The reproduction device 400 mainly has a communication section 410, a control section 420, and a display section 430. The control section 420 mainly has a function of an analysis section 421, a function of a search section 422, a function of a superimposition section 423, and a function of a display control section 424.

The communication section 410 is a network interface for communicating with another device via a network 500 such as the Internet. The control section 420 controls an overall operation of the reproduction device 400. For example, the display section 430 includes a cathode ray tube (CRT) display device, a liquid crystal display (LCD) device, an organic light emitting diode (OLED) device, or a display device such as a lamp.

The analysis section 421 has a function of analyzing content to be reproduced by the reproduction device 400. For example, the analysis section 421 has a function of acquiring information necessary for the search section 422 to search for tag information by analyzing shooting information supplementary to content data. If necessary, the analysis section 421 may have a function of analyzing a content video itself.

The search section 422 has a function of searching for the tag information to be superimposed on the content data to be reproduced from a database within the data center 1000.

Here, the search section 422 generates search conditions suitable for searching for the tag information stored in the key-value type data store, transmits the search conditions to the tag information management server 190 within the data center 1000, and acquires a search result. Next, details of the tag information search processing will be described using FIG. 21.

The superimposition section 423 performs processing of superimposing a tag on video content to be reproduced from the tag information acquired by the search section 422. Details of the superimposing processing will be described later. The display control section 424 has a function of reproducing the content data, and reproduces the content data on which the tag is superimposed by the superimposition section 423.

Figure 21A:
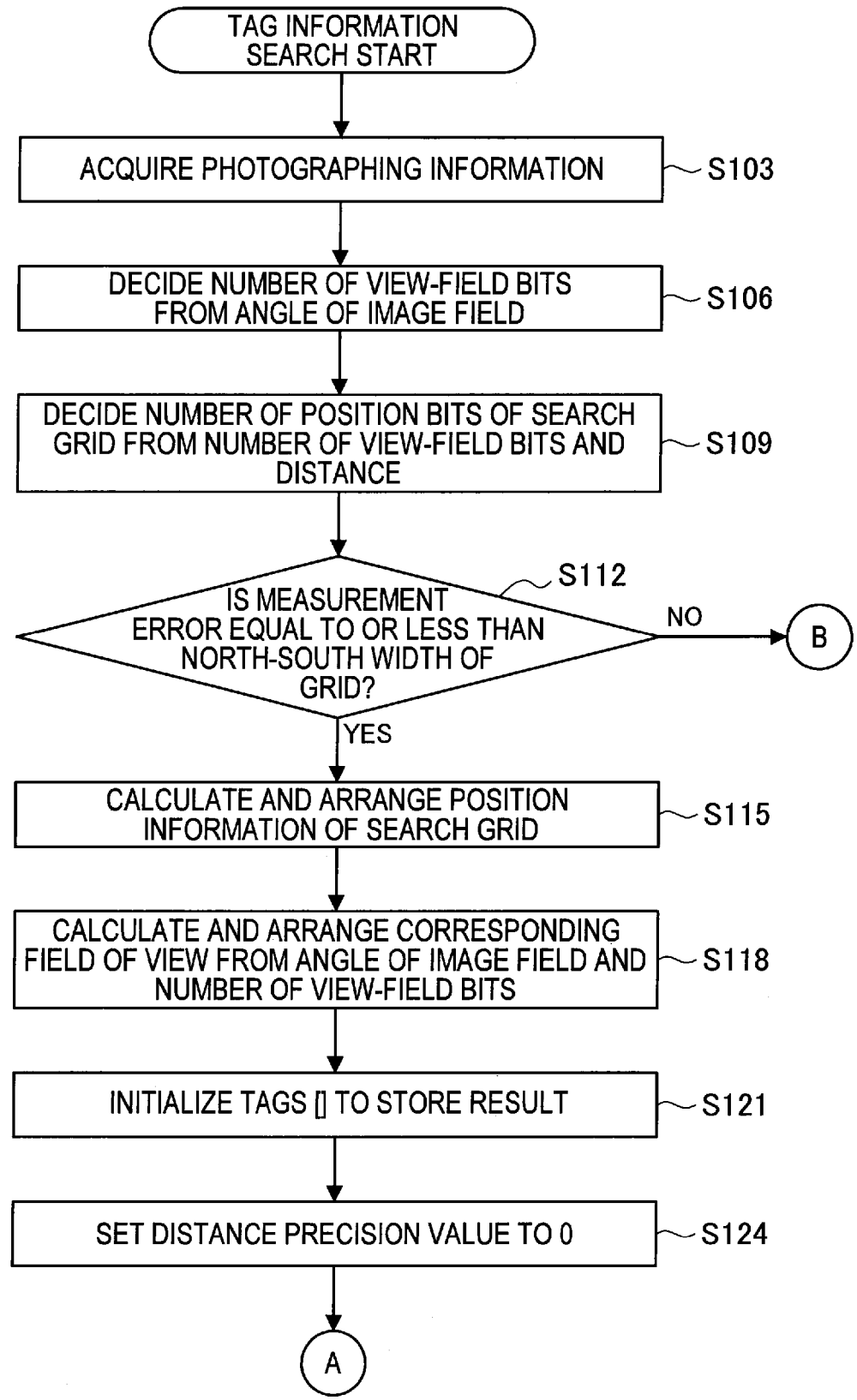
FIG. 21A is a flowchart showing a tag information search operation.
Figure 21B:
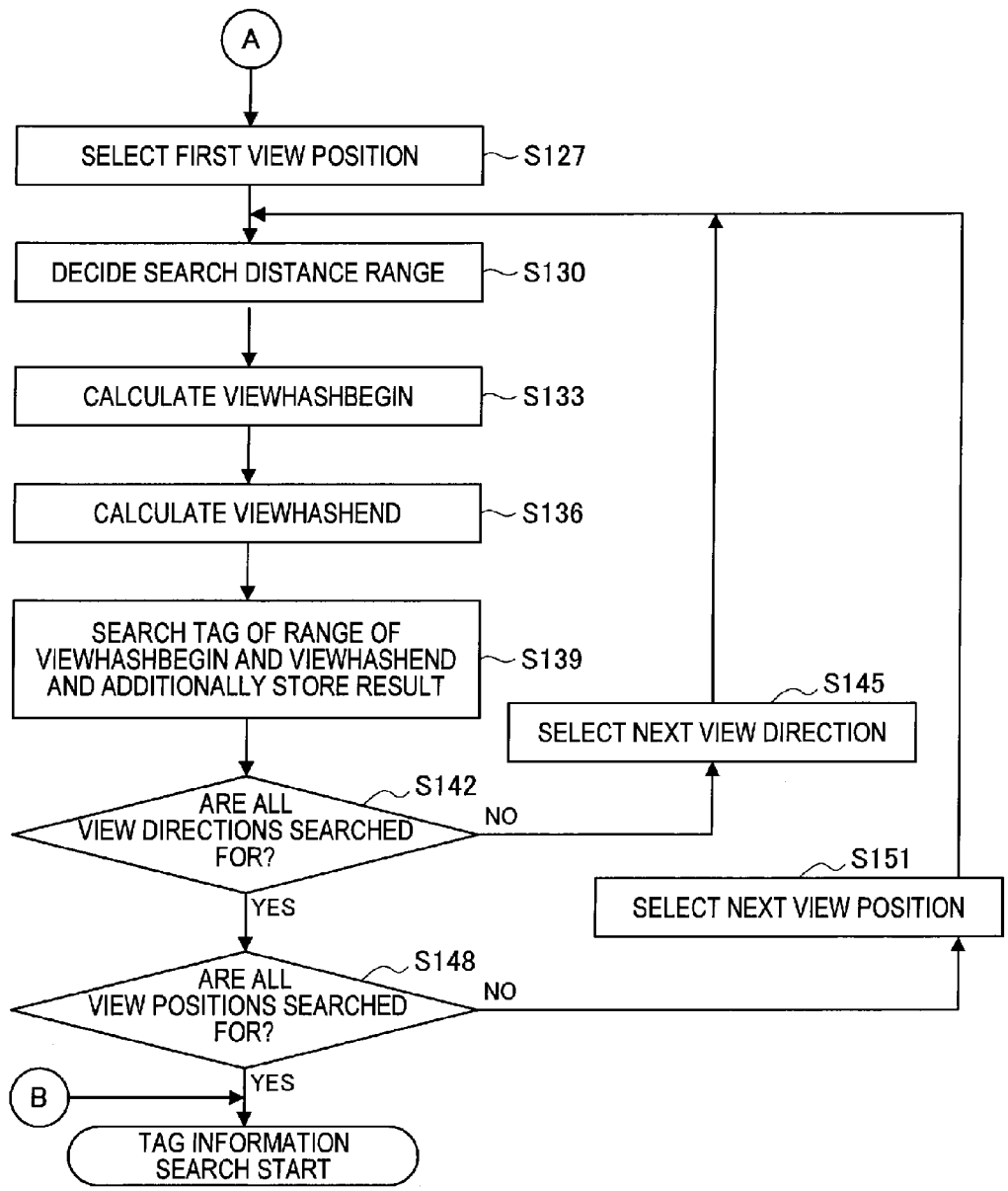
FIG. 21B is a flowchart showing a tag information search operation.

FIG. 21 is a flowchart showing a tag search operation. In the key-value type data store, key values can be arranged in a range by designating the start and end of the key values. Thus, a search of the key-value type data store by ViewHashBegin and ViewHashEnd and a search of a field of view and a partition are repeated from position information of a captured image, an azimuth, and a range of a subject distance of the captured image. In this regard, it is easy to perform distributed processing in the key-value type data store as described above. Thus, if search requests are performed in parallel, it is possible to distribute and process the search requests.

The tag information search processing is first started when the reproduction device 400 acquires shooting information of an image serving as an object (S103). The search section 422 decides the number of field-of-view bits from information of an angle of view of the acquired shooting information (S106). Next, the search section 422 decides the number of position bits of a grid to be searched for from the decided number of field-of-view bits and information of a distance acquired from the shooting information (S109).

Next, the search section 422 determines whether or not a measurement error value is equal to or less than a north-south width of a grid (S112). If it is determined that the measurement error is greater than the north-south width of the grid by the determination in step S112, the processing is terminated by moving to B since it is not possible to specify a grid of a search object.

On the other hand, if it is determined that the measurement error is equal to or less than the north-south width of the grid by the determination of step S112, the search section 422 calculates position information of the grid to be searched for and sets the position information in an arrangement (S115). The search section 422 calculates and arranges a corresponding field of view from an angle of view and the number of field-of-view bits (S118).

The search section 422 initializes an arrangement of Tags[ ] to store a result (S121), and sets a distance precision value to 0 (S124). Next, the search section 422 selects a first view position by moving to FIG. 21B (S127), and decides a search distance range (S130).

The search section 422 calculates ViewHashBegin (S133), and calculates ViewHashEnd (S136). The search section 422 searches for a tag of a range between ViewHashBegin and ViewHashEnd calculated in steps S133 and S136.

Specifically, the search section 422 generates search conditions and transmits the search conditions to the tag information management server 190. The search section 422 acquires a search result satisfying the transmitted search conditions. The search section 422 adds and stores the acquired search result to Tags[ ] (S139).

It is determined whether all view directions are searched for (S142) and whether all view positions are searched for (S148), and the processing from step S130 is repeated until a full search is completed.

Figure 22:
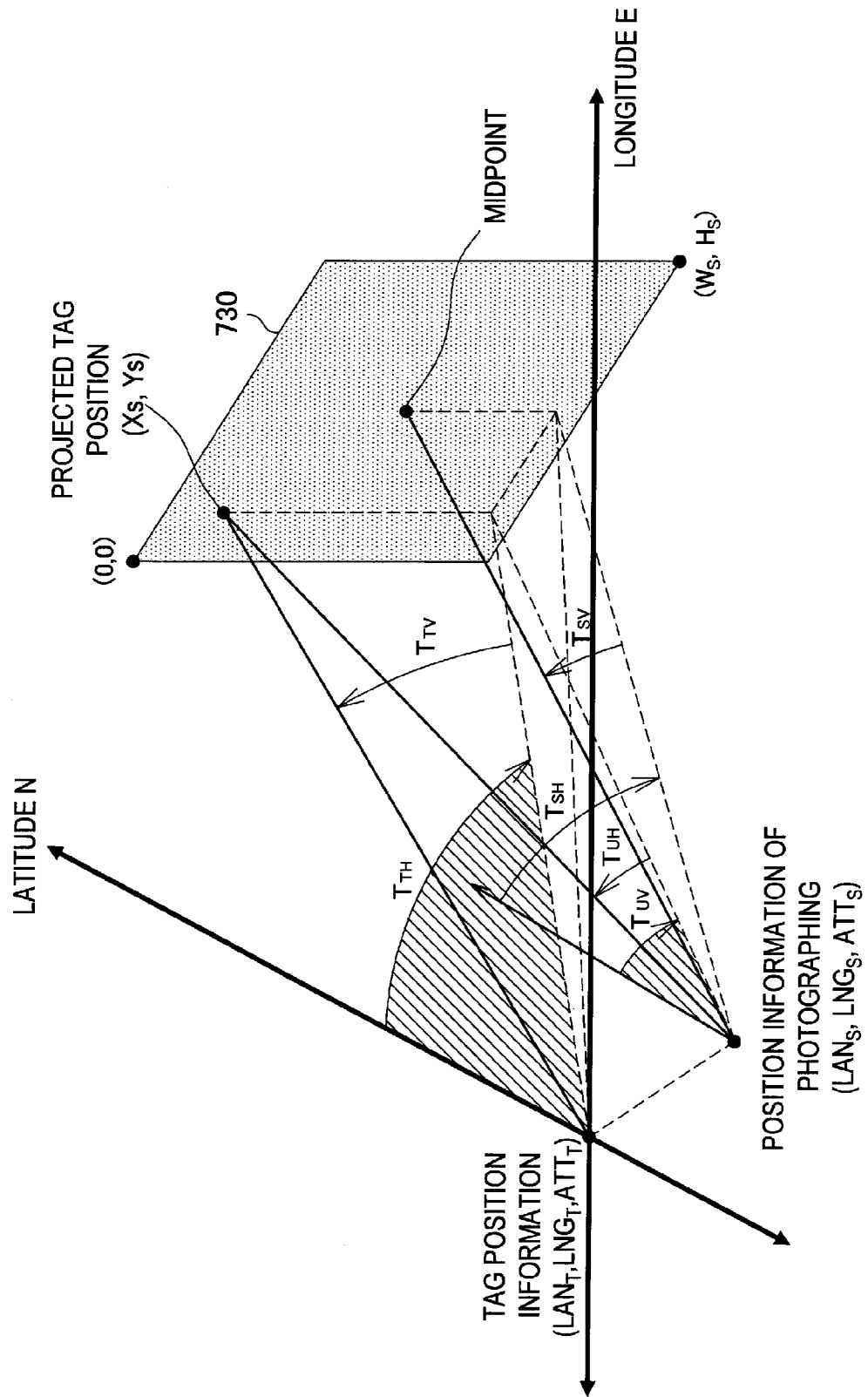
FIG. 22 is an illustrative diagram of projection of tag information to a video.

Next, superimposition processing, which is performed by the superimposition section 423 of the reproduction device 400, will be described with reference to FIG. 22. FIG. 22 is an illustrative diagram showing a method of superimposing tag information obtained by the search on another video.

If distances of three sides are known, an included angle can be obtained from a cosine theorem and an azimuth of a tag projected to a field of view viewed from a shooting point of view can be obtained by the following equations from point-of-view coordinates and an azimuth of the tag.

Horizontal Azimuth Angle of Projected Tag:

$$T_{UH}=T_{TH}-\cos^{-1}(D_U^2+D_A^2-D_{DH}^2)/(2*D_U*D_S) \text{ where } T_{SH}>=T_{TH}$$

$$T_{UH}=T_{TH}+\cos^{-1}(D_U^2+D_S^2-D_{DH}^2)/(2*D_U*D_S) \text{ where } T_{SH}<T_{TH}$$

Vertical Azimuth Angle of Projected Tag:

$$T_{UV}=T_{TV}+\cos^{-1}(D_U^2+D_S^2-D_{DV}^2)/(2*D_U*D_S) \text{ where } T_{SV}>T_{TV}$$

$$T_{UV}=T_{TV}+\cos^{-1}(D_U^2+D_S^2-D_{DV}^2)/(2*D_U*D_S) \text{ where } T_{SV}<T_{TV}$$

Here, information is indicated by the following symbols.
Position Information of Tag: $LAN_T$, $LNG_T$, $ATT_T$
Position Information of Shooting Point: $LAN_S$, $LNG_S$, $ATT_S$
Horizontal Direction Distance between Points of View: $D_{DH}$
Vertical Direction Distance between Points of View: $D_{DV}$
Horizontal Azimuth Angle of Tag: $T_{TH}$
Vertical Azimuth Angle of Tag: $T_{TV}$
Tag Distance: $D_T$
Subject Distance: $D_S$ If $D_{DH}$ is a horizontal distance of two points of view and a vertical distance $D_{DV}$ is 0 without an elevation difference between points of view, $D_{DH}$ is a distance obtained by the Hubeny formula from longitudes and latitudes of the two points. $D_{Sh}$ is a subject distance of a captured image. Here, a hyper-focal distance is used and $D_{Th}$ is a distance of tag information. Since the vertical distance $D_{DV}$ is 0, a projected vertical azimuth angle becomes equal to a vertical azimuth angle of a tag.

If a searched tag is projected to a captured video, the above-described coordinate conversion is performed for all searched tags and only an azimuth angle of a tag which fits into an angle of view of shooting is selected and projected. On the basis of the tag information, for example, only something having high priority designated in the above-described type is displayed or filtered and displayed.

If a horizontal azimuth angle and a vertical azimuth angle of a projected tag are obtained, coordinates in an image plane of a captured video can be obtained in the following equation.

$$\text{Projected Tag Position } Xs=((T_{UH}-T_{SH})/T_{SW}+\tfrac{1}{2})*W_S$$

$$\text{Projected Tag Position } Ys=(\tfrac{1}{2}-(T_{UV}-T_{SV})/(T_{SW}*H_S/W_S))*H_S$$

Horizontal Angle of view of Captured Video: $T_{SW}$
Number of Horizontal Pixels of Captured Video: $W_S$
Number of Vertical Pixels of Captured Video: $H_S$
Pixel Aspect Ratio: 1:1
Horizontal Azimuth Angle of Shooting Direction: $T_{SH}$
Vertical Azimuth Angle of Shooting Direction: $T_{SV}$ <5. Example of Effect>

A method of managing tag information added to an image in the key-value type data store, searching for tag information capable of projecting shooting information of another image, and superimposing and displaying the tag information has been shown above.

According to this configuration, it is possible to generate, share, and use tag information associated with coordinates on a field-of-view space viewed from a certain point-of-view position. Thereby, it is possible to share meaningful information only in a video viewed from a position where the video is captured, and an azimuth in which the video is captured, by predetermined shooting conditions.

A view hash capable of briefly expressing the tag information, point-of-view position information, a subject distance, and the error precision of the position information has been newly proposed. If tag information is managed by the key-value type data store with use of the view hash, it is possible to perform a search at high speed and light processing load even when an amount of tag information is large.

<6. Application Example>

Next, an example of a service capable of being realized by applying a tag information management method according to an embodiment of the present disclosure will be described.

Figure 23:
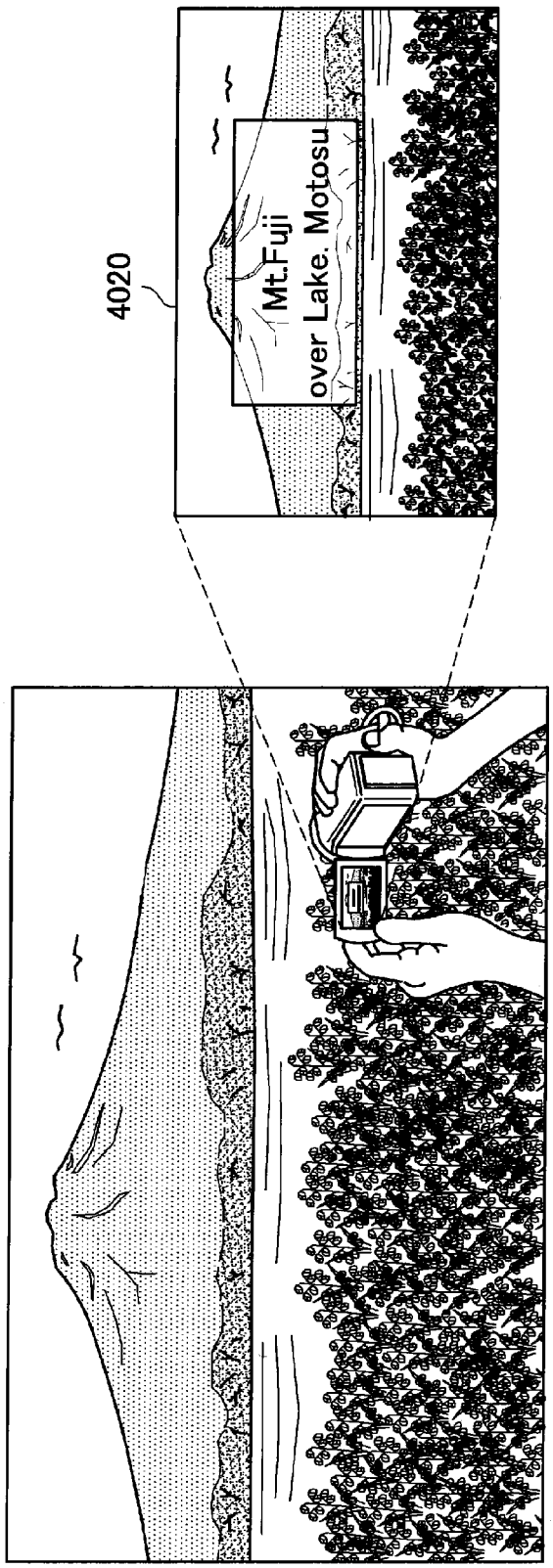
FIG. 23 is an example of a service to which the information processing system is applied.

For example, FIG. 23 is an example of superimposing and displaying a tag on a video of landscape shot using a video camera in real time. A video to be superimposed is video content shooted and stored in advance in FIG. 1, but the present disclosure is not limited to this example. As shown in FIG. 23, a tag may be displayed for a video during shooting in real time.

The tag information is acquired via a network such as the Internet in the above-described embodiment, but the present disclosure is not limited to this example. For example, it is possible to display a tag without establishing a connection to the network if tag information of a region of a visiting destination is stored in advance in a storage section within the imaging device.

Figure 24:
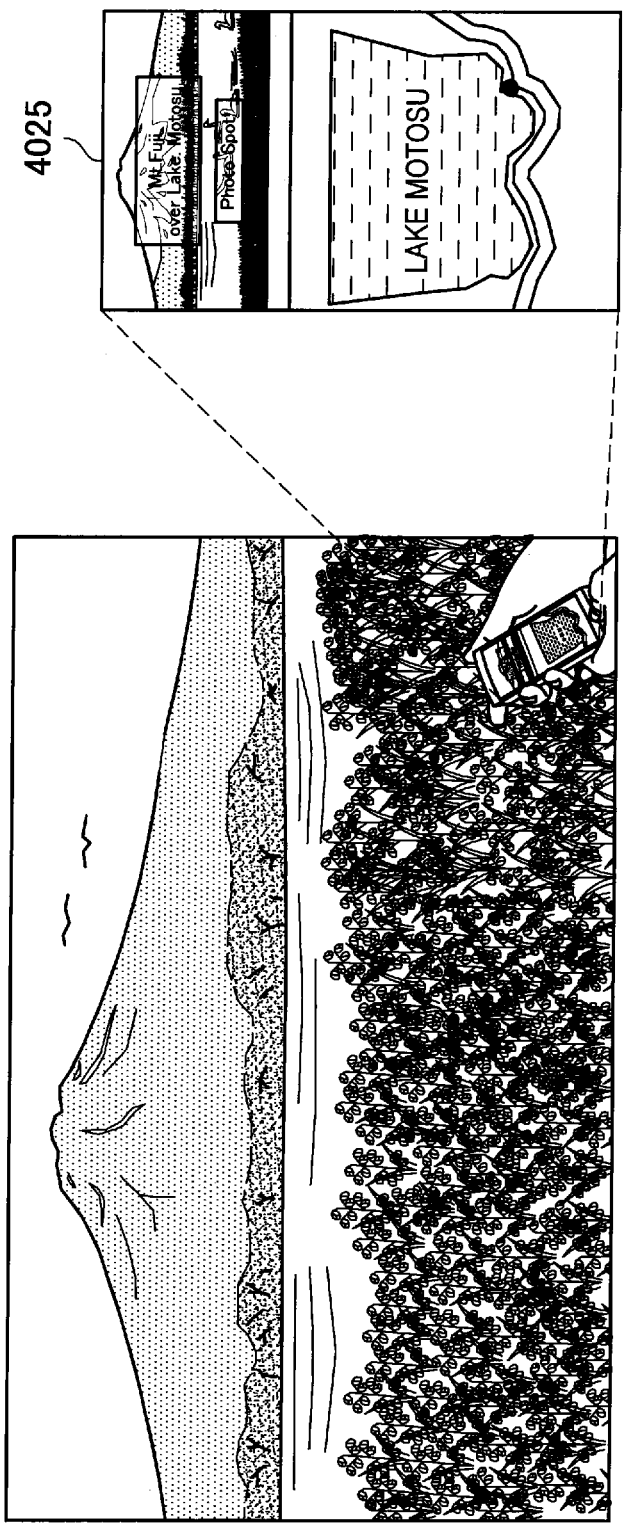
FIG. 24 is another example of a service to which the information processing system is applied.

FIG. 24 is an example of displaying a video 4025 in which a tag is displayed on a video captured in advance along with map information. Tag information is not necessarily meaningful when the tag information is superimposed on a real-time video. If what is an object on a viewed landscape is known, the tag information may be superimposed and shown on a previous video. According to this configuration, it is possible to obtain desired information naturally in the same posture as, for example, when texting manipulation for mail is performed in a mobile phone even if an operation of directing a lens of an imaging device to a subject is not performed. The lens of the imaging device is necessarily directed to the object when a tag is superimposed on a real-time video, but this configuration is effective when it is difficult to perform the above-described operation due to time and space.

The device of FIG. 24 can notify a user of information of a spot suitable for taking a photo. For example, the video distribution server 180 having content data can realize the above-described service by analyzing point-of-view information indicating a shooting position of stored content data. For example, there is a high possibility that a spot where a large amount of point-of-view information is collected will be suitable for taking a photo. Thus, this information may be used to provide a function of recommending a shooting position.

Preferred embodiments of the present disclosure have been described above in detail with reference to the appended drawings, but the present disclosure is not limited thereto. It should be understood by those skilled in the art that various modifications, combinations, sub-combinations and alterations may occur depending on design requirements and other factors insofar as they are within the scope of the appended claims or the equivalents thereof.

For example, a GPS function and an azimuth function are provided in a digital still camera and a digital video camera and data of the key-value type data store is generated from shooting information recorded in a file by the functions and a tag added by the user using a PC to its image in this embodiment, but it is possible to automatically generate tag information from a certain point of view by processing of a computer when a coordinate position of an object and information related thereto, for example, a mountain name and the like, are known.

Tag information having a large error in coordinates of the tag information may not be used due to a measurement error of GPS in the related art, but it is possible to easily search for another tag present in an adjacent partition of the tag information, and also it is possible to obtain image information based on tag generation from the tag information, according to this embodiment. Thus, position information of the tag can be easily corrected by analyzing an image based on the tag generation, approximating an object, and searching for an image having accurate positional precision from an adjacent partition.

In this embodiment, tag information having a large error in coordinates of the tag information may not be used due to a measurement error of GPS. However, since it is possible to easily search for another tag present in an adjacent partition of the tag information, and also it is possible to obtain image information based on tag generation from the tag information, according to this embodiment, position information of the tag can be easily corrected by analyzing its image, approximating an object, and searching for an image having accurate positional precision from an adjacent partition.

Tag information may not be used if coordinate information of an image captured to perform a tag information search also has a large measurement error of GPS, but tag information of an adjacent partition can be searched for from the coordinate information of the captured image. Thus, the coordinate information of the captured image can be easily corrected on the basis of coordinates of an image whose feature quantity is approximated by comparing information of the captured image with a feature quantity of an image based on tag information around its shooting coordinates. This scheme can be adapted to correction of position information of a video camera that performs shooting in real time.

An example in which depth information of a field-of-view space is acquired from shooting information supplementary to content or a hyper-focal distance is used has been described in the above-described embodiment, but the present disclosure is not limited to this example. For example, a value capable of expressing a distance to a subject, which can be acquired using all analysis technologies, like a tag distance, may be used.

In this specification, the steps shown in the flowchart include not only the processing executed in chronological order according to the sequence described therein but also the processing executed in parallel or individually, not necessarily processed in chronological order. Further, the steps processed in chronological order can be performed in a different sequence as appropriate depending on the circumstances.

REFERENCE SIGNS LIST

100: Tag information generation server group
110: Communication section
120: Control section
121: Point-of-view information acquisition section
122: Field-of-view information acquisition section
124: Tag information generation section
200: Imaging device
300: Terminal device
400: Reproduction device
410: Communication section
420: Control section
421: Analysis section
422: Search section
423: Superimposition section
424: Display control section
430: Display section
500: Network

The invention claimed is:

1. An information processing apparatus comprising:
a terminal device that
acquires first information corresponding to a position of an imaging device that captures image data,
acquires second information corresponding to a field of view of the imaging device that captures the image data, and
generates tag information, including a description of a subject of the captured image data and error information indicating a precision of position information corresponding to the imaging device included in the tag information, based on the first and second information, wherein
the description of the subject changes based on a point of view of the subject in the captured image data.

2. The information processing apparatus of claim 1, wherein the tag information includes information corresponding to a latitude and longitude of the imaging device.

3. The information processing apparatus of claim 1, wherein the tag information includes information corresponding to an altitude of the imaging device.

4. The information processing apparatus of claim 1, wherein the tag information includes information corresponding to an azimuth of the imaging device.

5. The information processing apparatus of claim 1, wherein the tag information includes information corresponding to a field of view angle of the imaging device.

6. The information processing apparatus of claim 1, wherein the tag information includes information corresponding to a height and width of the captured image data.

7. The information processing apparatus of claim 1, wherein the tag information includes information corresponding to a distance between the imaging device and the subject of the captured image.

8. The information processing apparatus of claim 1, wherein the tag information includes information identifying a position that the tag is to be displayed on displayed image data.

9. The information processing apparatus of claim 1, wherein the tag information includes a character string of the description to be displayed on displayed image data.

10. The information processing apparatus of claim 1, wherein the description of the subject is a description of a plurality of objects captured by the imaging device in the image data.

11. An information processing method comprising:
acquiring, by a terminal device of an information processing apparatus, first information corresponding to a position of an imaging device that captures image data;
acquiring, by the terminal device, second information corresponding to a field of view of the imaging device that captures the image data; and generating, by the terminal device, tag information, including a description of a subject of the captured image data and error information indicating a precision of position information corresponding to the imaging device included in the tag information, based on the first and second information, wherein the description of the subject changes based on a point of view of the subject in the captured image data.

12. A non-transitory computer-readable medium including computer program instructions, which when executed by an information processing apparatus, cause the information processing apparatus to perform a method comprising:

acquiring first information corresponding to a position of an imaging device that captures image data;

acquiring second information corresponding to a field of view of the imaging device that captures the image data; and generating tag information, including a description of a subject of the captured image data and error information indicating a precision of position information corresponding to the imaging device included in the tag information, based on the first and second information, wherein the description of the subject changes based on a point of view of the subject in the captured image data.

* * * * *